United States Patent
Jung et al.

(10) Patent No.: US 12,512,933 B2
(45) Date of Patent: Dec. 30, 2025

(54) ELECTRONIC DEVICE FOR PREVENTING PATH LOSS IN A 5G COMMUNICATION SYSTEM USING MMWAVE BAND, AND METHOD OF OPERATING SAME

(71) Applicant: Samsung Electronics Co., Ltd., Suwon-si (KR)

(72) Inventors: Euichang Jung, Suwon-si (KR); Seungnyun Kim, Suwon-si (KR); Dongil Son, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 17/837,709

(22) Filed: Jun. 10, 2022

(65) Prior Publication Data

US 2022/0303078 A1    Sep. 22, 2022

Related U.S. Application Data

(63) Continuation of application No. PCT/KR2020/017671, filed on Dec. 4, 2020.

(30) Foreign Application Priority Data

Dec. 13, 2019  (KR) .......................... 10-2019-0167163

(51) Int. Cl.
*H04L 5/00* (2006.01)

(52) U.S. Cl.
CPC .......... *H04L 5/0023* (2013.01); *H04L 5/0035* (2013.01); *H04L 5/0042* (2013.01); *H04L 5/0051* (2013.01)

(58) Field of Classification Search
CPC ... H04L 5/0023; H04L 5/0035; H04L 5/0042; H04L 5/0051; H04L 1/0023;
(Continued)

(56) References Cited

U.S. PATENT DOCUMENTS

2008/0056414 A1    3/2008  Kim et al.
2010/0222063 A1    9/2010  Ishikura et al.
(Continued)

FOREIGN PATENT DOCUMENTS

CN    108702196 A    10/2018
CN    109565339 A    4/2019
(Continued)

OTHER PUBLICATIONS

Ali Cirik, "Bandwidth Part Operation In New Radio", Mar. 28, 2019, (Year: 2019).*
(Continued)

*Primary Examiner* — Lan N Moore
*Assistant Examiner* — Latresa A McCallum
(74) *Attorney, Agent, or Firm* — Jefferson IP Law, LLP

(57) ABSTRACT

An electronic device and a method for receiving data from a plurality of transmission nodes in an electronic device are provided. The electronic device includes a wireless communication circuit that transmits/receives wireless signals, a plurality of antenna modules that are electrically connected to the wireless communication circuit, and a processor that is electrically connected to the wireless communication circuit and the plurality of antenna modules, wherein the processor is configured to receive control information from at least one of the transmission nodes by using a first antenna module among the plurality of antenna modules, in case that data is received from a plurality of transmission nodes based on the control information, select at least one antenna module among the plurality of antenna modules, and form a reception beam based on the at least one antenna module.

10 Claims, 24 Drawing Sheets

(58) Field of Classification Search
CPC ... H04L 27/261; H04L 5/0048; H04L 5/0053; H04L 5/0092; H04B 7/024; H04B 7/0408; H04B 7/0802; H04B 7/0808; H04B 7/0822; H04B 7/0834; H04B 7/086; H04B 7/0874; H04B 7/088
See application file for complete search history.

(56) References Cited

U.S. PATENT DOCUMENTS

| | | | |
|---|---|---|---|
| 2014/0139372 A1* | 5/2014 | Seol | H01Q 3/24 |
| | | | 342/367 |
| 2015/0282122 A1* | 10/2015 | Kim | H04B 7/0639 |
| | | | 370/329 |
| 2016/0066279 A1 | 3/2016 | Lee et al. | |
| 2016/0381570 A1* | 12/2016 | Lysejko | H01Q 3/24 |
| | | | 455/562.1 |
| 2017/0245317 A1 | 8/2017 | Lee et al. | |
| 2017/0366235 A1 | 12/2017 | Kim et al. | |
| 2018/0054832 A1 | 2/2018 | Luo et al. | |
| 2018/0109303 A1 | 4/2018 | Yoo et al. | |
| 2018/0152850 A1 | 5/2018 | Lee et al. | |
| 2018/0234960 A1 | 8/2018 | Nagaraja et al. | |
| 2019/0132851 A1 | 5/2019 | Davydov et al. | |
| 2019/0260456 A1 | 8/2019 | Zhou et al. | |
| 2019/0260458 A1 | 8/2019 | Zhou et al. | |
| 2019/0297603 A1 | 9/2019 | Guo et al. | |
| 2019/0379439 A1 | 12/2019 | Bolin et al. | |
| 2020/0028544 A1 | 1/2020 | Bengtsson et al. | |
| 2020/0314885 A1* | 10/2020 | Cirik | H04L 5/0048 |
| 2020/0343981 A1* | 10/2020 | Garcia | H04B 7/0408 |
| 2020/0373988 A1* | 11/2020 | Wang | H04B 7/066 |
| 2022/0225320 A1 | 7/2022 | Li | |
| 2023/0361817 A1* | 11/2023 | Cao | H04B 7/0608 |

FOREIGN PATENT DOCUMENTS

| | | |
|---|---|---|
| CN | 110268778 A | 9/2019 |
| EP | 3 258 635 A1 | 12/2017 |
| KR | 10-2008-0021494 A | 3/2008 |
| KR | 10-1036043 B1 | 5/2011 |
| KR | 10-2016-0026089 A | 3/2016 |
| KR | 10-2018-0059274 A | 6/2018 |
| KR | 10-2019-0116398 A | 10/2019 |
| TW | 201937950 A | 9/2019 |
| WO | 2017/003172 A1 | 1/2017 |
| WO | 2017/192889 A1 | 11/2017 |
| WO | 2018/037838 A1 | 3/2018 |
| WO | 2018/148552 A1 | 8/2018 |
| WO | 2018/174895 A1 | 9/2018 |
| WO | 2019/029631 A1 | 2/2019 |

OTHER PUBLICATIONS

LG Electronics, Enhancements on multi-TRP/panel transmission, 3GPP TSG RAN WG1 Meeting #99, R1-1912269, Reno, USA, Nov. 9, 2019 XP051823334, https://ftp.3gpp.org/tsg_ran/WG1_RL1/TSGR1_99/Docs/R1-1912269.
Extended European Search Report dated Feb. 22, 2023, issued in European Application No. 20899645.4.
Partial supplementary European Search Report dated Nov. 8, 2022, issued in European Patent Application No. 20899645.4.
Ericsson, 'Maintenance for multi-antenna scheme', 3GPP TSG-RAN WG1 Meeting #94, R1-1809195, Goteborg, Sweden, Aug. 11, 2018.
Chinese Office Action dated May 29, 2024, issued in Chinese Application No. 202080086644.0.
NTT Docomo, Inc., Enhancements on multi-TRP/panel transmission, R1-1813333, 3GPP TSG RAN WG1 Meeting #95, Spokane, USA, Nov. 12-16, 2018.
Panasonic, On multi-TRP enhancements for NR MIMO in Rel. 16, R1-1908972, 3GPP TSG RAN WG1 #98, Prague, CZ, Aug. 26-30, 2019.
Chinese Office Action dated Oct. 31, 2024, issued in counterpart Chinese Application No. 202080086644.0.
Korean Office Action dated Nov. 8, 2024, issued in counterpart Korean Application No. 10-2019-0167163.
Chinese Decision to Grant dated Feb. 21, 2025, issued in Chinese Application No. 202080086644.0.

\* cited by examiner

FIG. 6D

ELECTRONIC DEVICE FOR PREVENTING PATH LOSS IN A 5G COMMUNICATION SYSTEM USING MMWAVE BAND, AND METHOD OF OPERATING SAME

CROSS-REFERENCE TO RELATED APPLICATION(S)

This application is a continuation application, claiming priority under § 365(c), of an International application No. PCT/KR2020/017671, filed on Dec. 4, 2020, which is based on and claims the benefit of a Korean patent application number 10-2019-0167163, filed on Dec. 13, 2019, in the Korean Intellectual Property Office, the disclosure of which is incorporated by reference herein in its entirety.

BACKGROUND

1. Field

The disclosure relates to an apparatus and a method for receiving data from multiple transmission nodes in an electronic device.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" communication system or a "post long-term evolution (post LTE)" system.

The 5G communication system is considered to be implemented in bands below 6 GHz (e.g., 1.8 GHz or 3.5 GHz bands) or bands above 6 GHz (e.g., 28 GHz or 39 GHz bands) so as to accomplish higher data rates. To decrease propagation loss of the radio waves and increase the transmission distance in ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The above information is presented as background information only to assist with an understanding of the disclosure. No determination has been made, and no assertion is made, as to whether any of the above might be applicable as prior art with regard to the disclosure.

SUMMARY

A 5G communication system may use a mmWave band (for example, 3G-100 GHz) to secure a relatively broad bandwidth or a relatively high data transmission rate. In a wireless communication system, the signal strength is proportional to the square of the wavelength, and the shorter the wavelength, the lower degree of diffraction, and the more difficult to penetrate obstacles. As a result, a 5G communication system that uses a mmWave band may have a noticeable path loss in a shaded area due to frequency characteristics. The 5G communication system may use a beamforming technology in an attempt to stably transmit signals to an electronic device positioned within the service area.

A 5G communication system may form various patterns of beams by a change in the phase of an antenna array including multiple antenna elements. The 5G communication system may transmit and/or receive signals by using beamforming not only in connection with a transmission node (for example, TRP (transmit-receive point) or base station) but also an electronic device. Therefore, the electronic device needs a scheme for operating various patterns of beams to receive signals.

Aspects of the disclosure are to address at least the above-mentioned problems and/or disadvantages and to provide at least the advantages described below. Accordingly, an aspect of the disclosure is to provide an apparatus and a method for receiving data from multiple transmission nodes (or multiple beams) in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit, a plurality of antenna modules electrically connected to the wireless communication circuit, and a processor electrically connected to the wireless communication circuit and the plurality of antenna modules, wherein the processor is configured to receive control information from at least one transmission node by using a first antenna module among the plurality of antenna modules, in case that data is received from a plurality of transmission nodes, based on the control information, select at least one antenna module among the plurality of antenna modules, and form a reception beam, based on the at least one antenna module.

In accordance with another aspect of the disclosure, a method for operating an electronic device is provided. The method includes receiving control information from at least one transmission node by using a first antenna module among a plurality of antenna modules, in case that data is received from a plurality of transmission nodes, based on the control information, selecting at least one antenna module from among the plurality of antenna modules, and forming a reception beam, based on the at least one antenna module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A, 6B, 6C, and 6D are examples of beam patterns supported by an antenna module of an electronic device according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
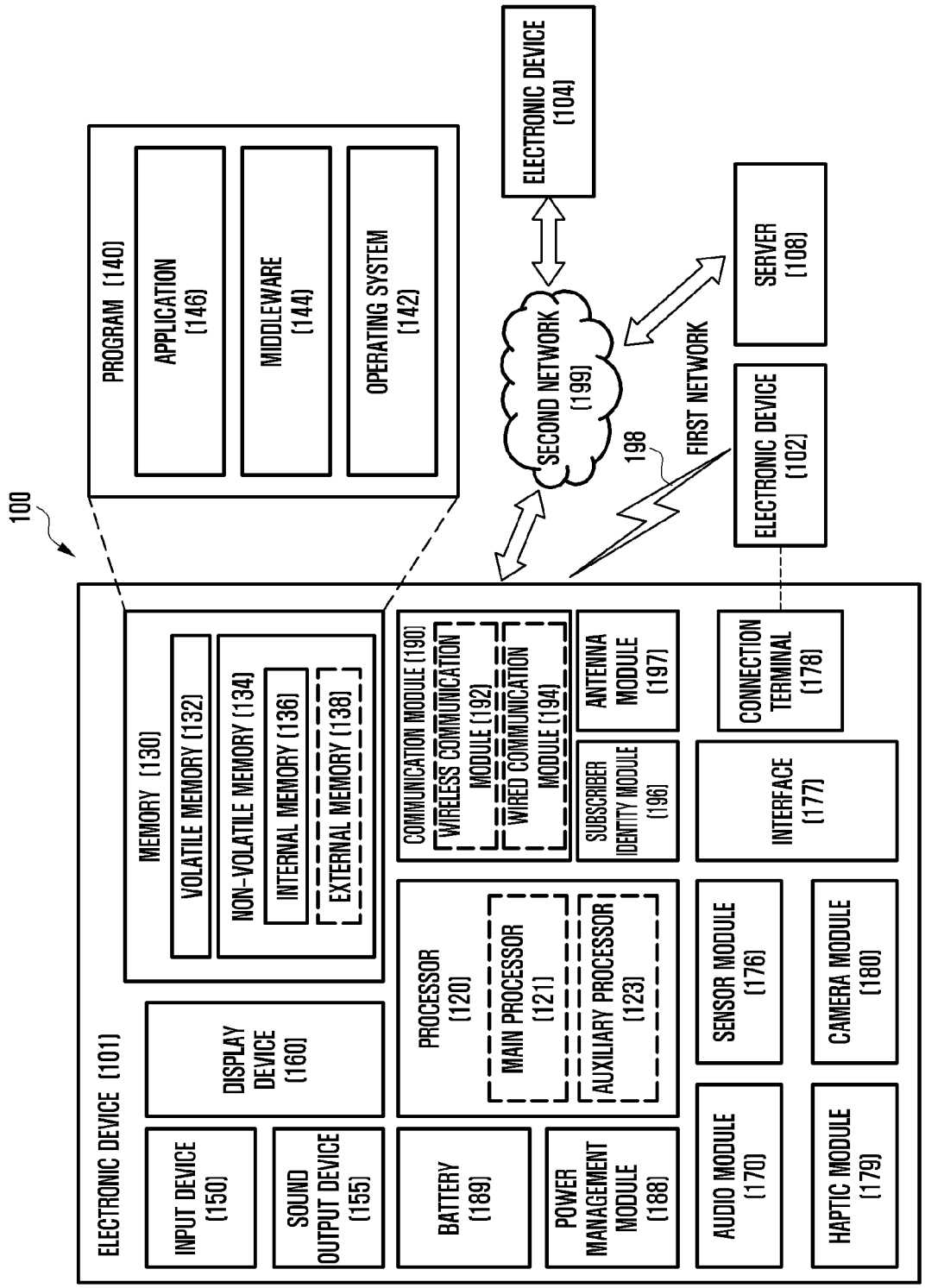
FIG. 1 is a block diagram of an electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
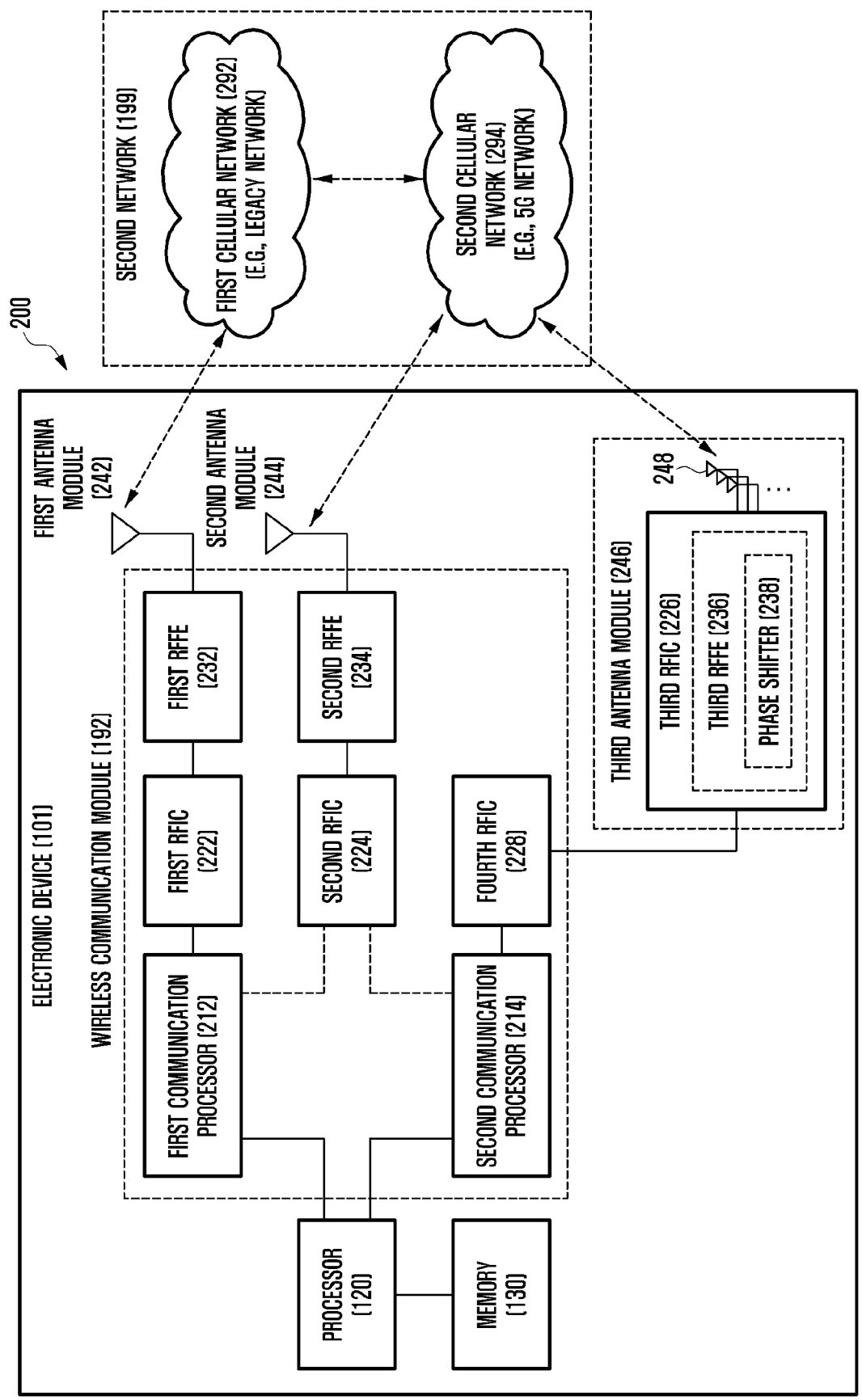
FIG. 2 is a block diagram of an electronic device for supporting legacy network communication and 5G network communication according to an embodiment of the disclosure.

FIG. 2 is a block diagram 200 of an electronic device 101 for supporting legacy network communication and 5G network communication according to an embodiment of the disclosure.

With reference to FIG. 2, an electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to another embodiment, the electronic device 101 may further include at least one of components described in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted, or may be included as a part of the third RFIC 226.

The first communication processor 212 may establish a communication channel of a band to be used for wireless communication with the first network 292, and may support legacy network communication through the established communication channel. According to an embodiment, the first network may be a legacy network including a second generation (2G), 3G, 4G, or long term evolution (LTE) network. The second communication processor 214 may establish a communication channel corresponding to a designated band (e.g., about 6 to 60 GHz) among bands to be used for wireless communication with the second network 294, and may support 5G network communication through the established communication channel. According to an embodiment, the second network 294 may be a 5G network (e.g., new radio (NR)) being defined in $3^{rd}$ Generation Partnership Project (3GPP). In addition, according to an embodiment, the first communication processor 212 or the second communication processor 214 may establish a communication channel corresponding to another designated band (e.g., about 6 GHz or less) among the bands to be used for the wireless communication with the second network 294, and may support 5G network communication through the established communication channel. According to an embodiment, the first communication processor 212 and the second communication processor 214 may be implemented in a single chip or a single package. According to an embodiment, the first communication processor 212 or the second communication processor 214 may be formed in a single chip or a single package with the processor 120, an auxiliary processor 123, or a communication module 190.

The first RFIC 222, during transmission, may convert a baseband signal generated by the first communication processor 212 into a radio frequency (RF) signal of about 700 MHz to about 3 GHz being used in the first network 292 (e.g., legacy network). During reception, the RF signal may be acquired from the first network 292 (e.g., legacy network) through the antenna (e.g., first antenna module 242), and may be preprocessed through the RFFE (e.g., first RFFE 232). The first RFIC 222 may convert the preprocessed RF signal into the baseband signal so that it can be processed by the first communication processor 212.

The second RFIC 224, during transmission, may convert a baseband signal generated by the first communication processor 212 or the second communication processor 214 into an RF signal (hereinafter, 5G Sub6 RF signal) of a Sub6 band (e.g., about 6 GHz or less) being used in the second network 294 (e.g., 5G network). During reception, the 5G Sub6 RF signal may be acquired from the second network 294 (e.g., 5G network) through the antenna (e.g., second antenna module 244), and may be preprocessed through the RFFE (e.g., second RFFE 234). The second RFIC 224 may convert the preprocessed 5G Sub6 RF signal into the baseband signal so that it can be processed by the corresponding communication processor between the first communication processor 212 and the second communication processor 214.

The third RFIC 226 may convert the baseband signal generated by the second communication processor 214 into an RF signal (hereinafter, 5G Above6 RF signal) of a 5G Above6 band (e.g., about 6 to 60 GHz) to be used in the second network 294 (e.g., 5G network). During reception, the 5G Above6 RF signal may be acquired from the second network 294 (e.g., 5G network) through the antenna (e.g., antenna 248), and may be preprocessed through the third RFFE 236. The third RFIC 226 may convert the preprocessed 5G Above6 RF signal into the baseband signal so that it can be processed by the second communication processor 214. According to an embodiment, the third RFFE 236 may be formed as a part of the third RFIC 226.

According to an embodiment, the electronic device 101, separately from the third RFIC 226 or as at least a part thereof, may include the fourth RFIC 228. In this case, the fourth RFIC 228 may convert the baseband signal generated by the second communication processor 214 into an RF signal (hereinafter, IF signal) of an intermediate frequency band (e.g., about 9 to 11 GHz), and may transfer the IF signal to the third RFIC 226. The third RFIC 226 may convert the IF signal into the 5G Above6 RF signal. During reception, the 5G Above6 RF signal may be received from the second network 294 (e.g., 5G network) through the antenna (e.g., antenna 248), and may be converted into the IF signal by the third RFIC 226. The fourth RFIC 228 may convert the IF signal into the baseband signal so that it can be processed by the second communication processor 214.

According to an embodiment, the first RFIC 222 and the second RFIC 224 may be implemented as at least parts of a single chip or a single package. According to an embodiment, the first RFFE 232 and the second RFFE 234 may be implemented as at least parts of the single chip or the single package. According to an embodiment, at least one of the first antenna module 242 or the second antenna module 244 may be omitted, or may be coupled to another antenna module to process RF signals of a corresponding plurality of bands.

According to an embodiment, the third RFIC 226 and the antenna 248 may be disposed on the same substrate, and may form the third antenna module 246. For example, the wireless communication module 192 or the processor 120 may be disposed on a first substrate (e.g., main PCB). In this case, the third antenna module 246 may be formed in a manner that the third RFIC 226 is disposed on one partial area (e.g., lower surface) of a second substrate (e.g., sub PCB) separately from the first substrate, and the antenna 248 is disposed on the other partial area (e.g., upper surface) thereof. By disposing the third RFIC 226 and the antenna 248 on the same substrate, it is possible to reduce a length of a transmission line between them. That is, for example, it is possible to reduce a loss (e.g., attenuation) of a signal of a high frequency band (e.g., about 6 to 60 GHz) being used for 5G network communication, which is caused by the transmission line. Because of this, the electronic device 101 can improve the quality or speed of communication with the second network 294 (e.g., 5G network).

According to an embodiment, the antenna 248 may be formed of an antenna array including a plurality of antenna elements capable of being used for beamforming. In this case, the third RFIC 226 may include a plurality of phase shifters 238 corresponding to the plurality of antenna elements, for example, as a part of the third RFFE 236. During transmission, each of the plurality of phase shifters 238 may change the phase of the 5G Above6 RF signal to be transmitted to an outside (e.g., base station of the 5G network) of the electronic device 101 through the corresponding antenna element. During reception, each of the plurality of phase shifters 238 may change the phase of the 5G Above6 RF signal received from the outside through the corresponding antenna element to the same or substantially the same phase. This enables the transmission or reception through beamforming between the electronic device 101 and the outside.

The second network 294 (e.g., 5G network) may operate independently of the first network 292 (e.g., legacy network) (e.g., standalone (SA)), or may operate through being connected to the first network 292 (e.g., non-standalone (NSA). For example, in the 5G network, only an access network (e.g., 5G radio access network (RAN) or next generation RAN (NG RAN)) may exist, but a core network (e.g., next generation core (NGC)) may not exist. In this case, the electronic device 101 may access an external network (e.g., Internet) under the control of a core network (e.g., evolved packed core (EPC)) of the legacy network after accessing the access network of the 5G network. Protocol information (e.g., LTE protocol information) for communication with the legacy network or protocol information (e.g., new radio (NR) protocol information) for communication with the 5G network may be stored in the memory 130, and may be accessed by another constituent element (e.g., the processor 120, the first communication processor 212, or the second communication processor 214).

Figure 3A:
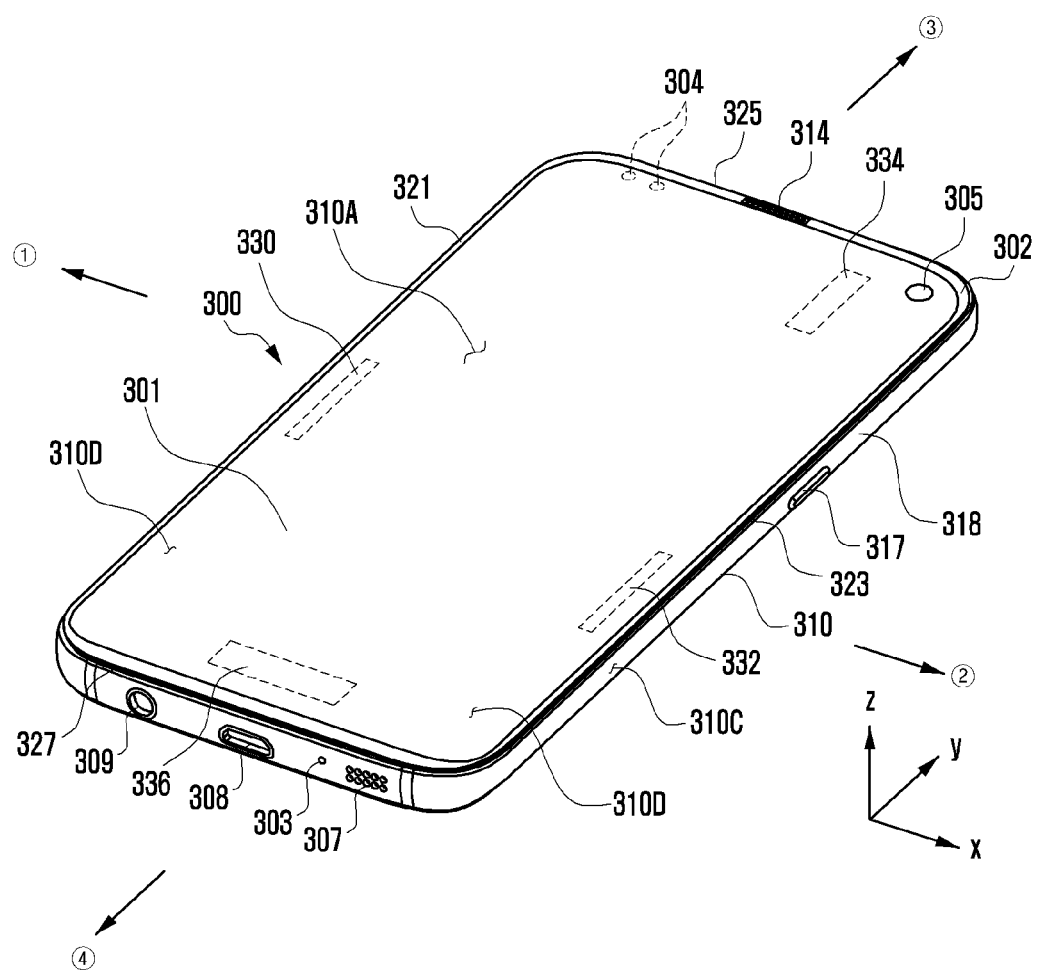
FIG. 3A is a perspective view of an electronic device according to an embodiment of the disclosure.
Figure 3B:
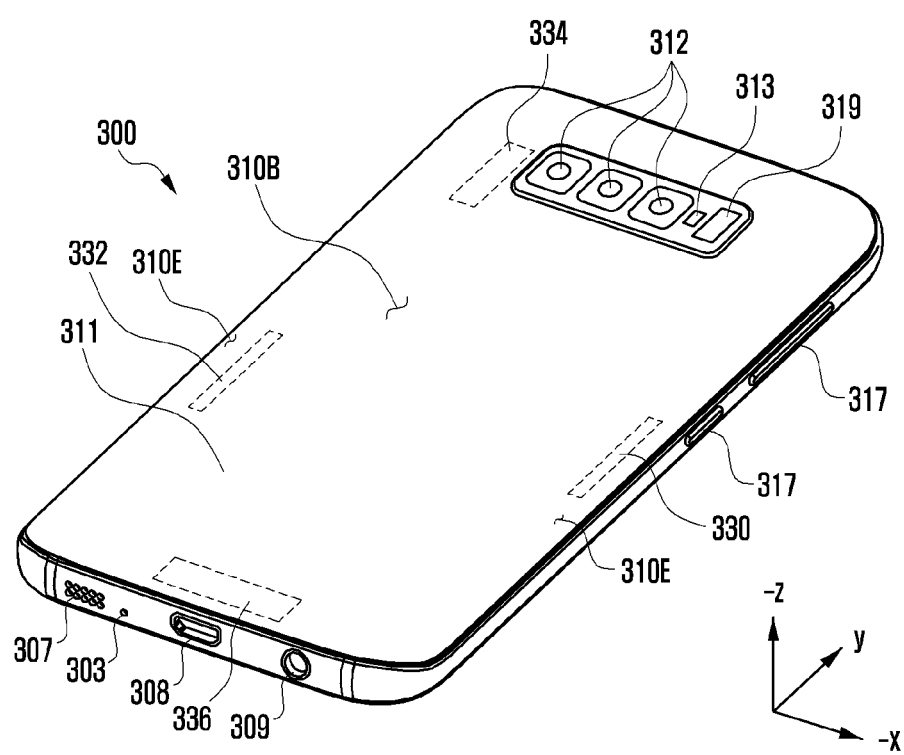
FIG. 3B is a rear perspective view of an electronic device according to an embodiment of the disclosure.

FIG. 3A is a front perspective view of the electronic device 300 according to an embodiment of the disclosure. FIG. 3B is a rear perspective view of the electronic device 300 of FIG. 3A, according to an embodiment of the disclosure. For example, the electronic device 300 of FIGS. 3A and 3B may be at least partially similar to the electronic device 101 of FIG. 1 or 2 or may include another embodiment of the electronic device.

Referring to FIGS. 3A and 3B, the electronic device 300 according to various embodiments may include a housing 310 including a first surface 310A (or a front surface), a second surface 310B (or a rear surface), and a side surface 310C surrounding a space between the first surface 310A and the second surface 310B. In another embodiment (not shown), a structure configuring a part of the first surface 310A, the second surface 310B, and the side surfaces 310C, which are shown in FIG. 3A, may be referred to as a housing. According to an embodiment, the first surface 310A may be formed by a front plate 302 (e.g., a glass plate including various coating layers, or a polymer plate) having at least a portion which is substantially transparent. The second surface 310B may be formed by a rear plate 311 which is substantially opaque. The rear plate 311 may be formed of, for example, coated or colored glass, ceramic, a polymer, a metal (e.g., aluminum, stainless steel (STS), or magnesium), or a combination of at least two thereof. The side surface 310C may be formed by a side bezel structure 318 (or a "side surface member") that is coupled to the front plate 302 and the rear plate 311 and includes a metal and/or a polymer. In an embodiment, the rear plate 311 and side bezel structure 318 may be integrally formed with each other and include the same material (e.g., a metal material such as aluminum).

In the illustrated embodiment, the front plate 302 may include first regions 310D, which are arranged at ends of opposite longer edges of the front plate 302, respectively, and are curved and seamlessly extend from the first surface 310A toward the rear plate 311. In the illustrated embodiment (see FIG. 3B), the rear plate 311 may include two second regions 310E arranged at ends of opposite longer edges thereof, respectively, and curved and seamlessly extending from the second surface 310B toward the front plate 302. In an embodiment, the front plate 302 or the rear plate 311 may include only one of the first regions 310D or the second regions 310E. According to an embodiment, the front plate 302 may not include the first regions 310D or the second regions 310E and may include only a flat plane disposed parallel to the second surface 310B. According to an embodiment, when the electronic device 300 is viewed from the side, the side bezel structure 318 may have a first thickness (or width) on a side surface including no first regions 310D or second regions 310E, as described above, and may have a second thickness thinner than the first thickness on a side surface including the first regions 310D or the second regions 310E.

According to various embodiments, the electronic device 300 may include at least one of a display 301, an input device 303, sound output devices 307 and 314, sensor modules 304 and 319, and camera modules 305, 312, and 313, a key input device 317, an indicator (not shown), and connectors 308 and 309. According to an embodiment, at least one (e.g., the key input device 317, the indicator, or the connector 309) of the elements may be omitted from the electronic device 300 or another element may be added to the electronic device 300.

According to an embodiment, the display 301 may be exposed through a substantial portion of the front plate 302. For example, at least a portion of the display 301 may be exposed through the front plate 302 forming the first surface 310A and the first regions 310D of the side surface 310C. According to an embodiment, the display 301 may be coupled to or disposed adjacent to a touch sensing circuit, a pressure sensor capable of measuring the intensity (pressure) of a touch, and/or a digitizer that detects a magnetic field type stylus pen. According to an embodiment, at least a portion of the sensor modules 304 and 319 and/or at least a portion of the key input device 317 may be placed in the first region 310D and/or the second region 310E.

According to an embodiment, the input device 303 may include a microphone 303. For example, the input device 303 may include a plurality of microphones 303 disposed to detect the direction of sound. According to an embodiment, the sound output devices 307 and 314 may include speakers 307 and 314. For example, the speakers 307 and 314 may include an external speaker 307 and a call receiver 314. According to an embodiment, the microphone 303, the speakers 307 and 314, and the connectors 308 and 309 may be disposed in a space of the electronic device 300 and may be exposed to the external environment through at least one hole formed through the housing 310. According to an embodiment, the hole formed through the housing 310 may be used for both the microphone 303 and the speakers 307 and 314. According to an embodiment, the sound output devices 307 and 314 may include a speaker (e.g., a piezo speaker) that operates while excluding a hole formed through the housing 310.

According to an embodiment, the sensor modules 304 and 319 may generate an electrical signal or data value corresponding to an internal operating state of the electronic device 300 or an external environmental state. For example, the sensor modules 304 and 319 may include a first sensor module 304 (e.g., a proximity sensor) and/or a second sensor module (not shown) (e.g., a fingerprint sensor) disposed on the first surface 310A of the housing 310, and/or a third sensor module 319 (e.g., an HRM sensor) disposed on the second surface 310B of the housing 310. The fingerprint sensor may be disposed on the first surface 310A of the housing 310. The fingerprint sensor (e.g., an ultrasonic or optical fingerprint sensor) may be disposed below the display 301 of the first surface 310A. For example, the electronic device 300 may further include at least one of a gesture sensor, a gyro sensor, a barometric pressure sensor, a magnetic sensor, an acceleration sensor, a grip sensor, a color sensor, an IR (infrared) sensor, a biometric sensor, a temperature sensor, a humidity sensor, or an illuminance sensor 304 which is not illustrated.

According to an embodiment, the camera modules 305, 312, and 313 may include a first camera device 305 disposed on the first surface 310A of the electronic device 300, a second camera device 312 disposed on the second surface 310B, and/or a flash 313. For example, the camera modules 305 and 312 may include one or more lenses, an image sensor, and/or an image signal processor. For example, the flash 313 may include a light emitting diode or a xenon lamp. For example, two or more lenses (a wide angle and telephoto lens) and image sensors may be disposed on one surface of the electronic device 300.

According to an embodiment, the key input device 317 may be disposed on the side surface 310C of the housing 310. In another embodiment, the electronic device 300 may not include some or any of the key input devices 317, and the key input devices 317 which are not included therein, may be implemented in other forms such as soft keys on the display 301. In another embodiment, the key input device 317 may be implemented using a pressure sensor included in the display 301.

According to an embodiment, the indicator may be disposed on the first surface 310A of the housing 310. For example, the indicator may provide state information of the electronic device 300 in the form of light. In another embodiment, the light emitting element may provide a light source that is interlocked with the operation of the camera module 305. For example, the indicator may include an LED, an IR LED, and a xenon lamp.

According to an embodiment, the connectors 308 and/or 309 may include a first connector 308 capable of receiving a connector (e.g., a USB connector or an interface (IF) connector port module) configured to transmit and receive power and/or data to and from an external electronic device, and/or a second connector hole 309 (or earphone jack) capable of accommodating a connector configured to transmit and receive an audio signal to and from the external electronic device.

According to an embodiment, specific camera modules 305 of the camera modules 305 and 312, specific sensor modules 304 of the sensor modules 304 and 319, or an indicator may be arranged to be exposed through the display 301. For example, the camera module 305, the sensor module 304, or the indicator may be arranged in the inner space of the electronic device 300 to be in contact with the external environment through an opening formed by perforating the front plate 302 of the display 301. In another embodiment, the specific sensor modules 304 may be arranged in the inner space of the electronic device to perform functions thereof without being visually exposed through the front plate 302. For example, in this case, the region of the display 301 facing the sensor module may not need a perforated opening.

According to various embodiments, the electronic device 300 may include a plurality of antenna modules 330, 332, 334, and 336 disposed at various positions in the inner space thereof. According to an embodiment, the plurality of antenna modules 330, 332, 334, and 336 may have substantially the same configuration and may be arranged such that beam patterns are at least partially formed in different directions in the internal space of the electronic device 300 or at least partially overlap with each other.

According to various embodiments, a first antenna module 330 may be disposed in the inner space of the electronic device 300 to be adjacent to the first side surface 321. According to an embodiment, the first antenna module 330 may form a beam pattern in a direction in which the rear plate (e.g., the rear plate 311 of FIG. 3B) of the electronic device 300 faces (e.g., −z direction of FIG. 3B) and/or in a direction in which the first side surface 321 faces (e.g., direction □).

According to various embodiments, a second antenna module 332 may be disposed in the inner space of the electronic device 300 to be adjacent to the second side surface 323. According to an embodiment, the second antenna module 332 may form a beam pattern in a direction in which the rear plate (e.g., the rear plate 311 of FIG. 3B) of the electronic device 300 faces (e.g., −z direction of FIG. 3B) and/or in a direction in which the second side surface 323 faces (e.g., direction □).

According to various embodiments, a third antenna module 334 may be disposed in the inner space of the electronic device 300 to be adjacent to the third side surface 325. According to an embodiment, the third antenna module 334 may form a beam pattern in a direction in which the rear plate (e.g., the rear plate 311 of FIG. 3B) of the electronic device 300 faces (e.g., −z direction of FIG. 3B) and/or in a direction in which the third side surface 325 faces (e.g., direction □).

According to various embodiments, a fourth antenna module 336 may be disposed in the inner space of the electronic device 300 to be adjacent to the fourth side surface 327. According to an embodiment, the fourth antenna module 336 may form a beam pattern in a direction in which the rear plate (e.g., the rear plate 311 of FIG. 3B) of the electronic device 300 faces (e.g., −z direction of FIG. 3B) and/or in a direction in which the fourth side surface 327 faces (e.g., direction ☐).

Figure 4A:
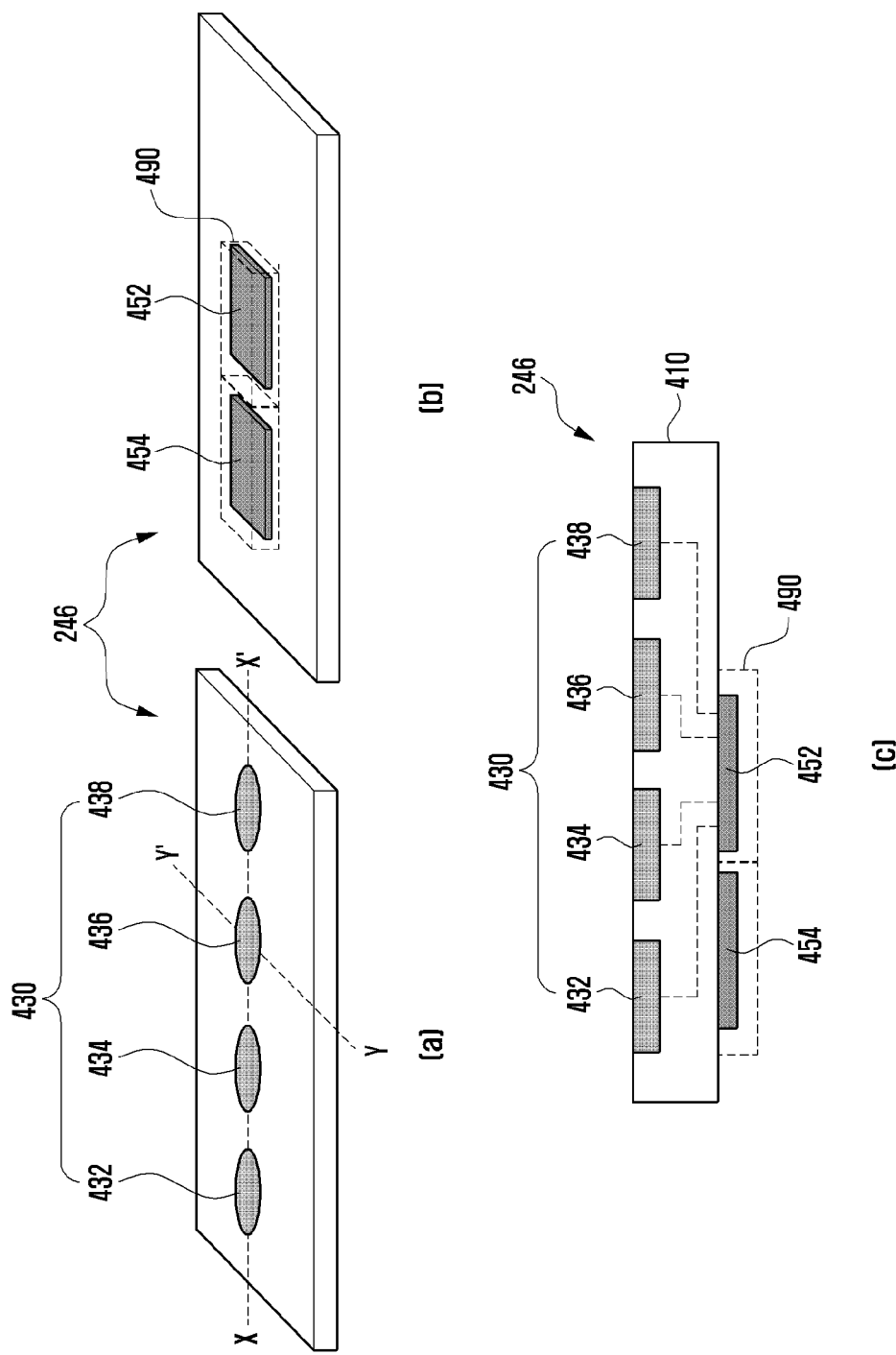
FIG. 4A shows an embodiment of a structure of a third antenna module described with reference to FIG. 2, according to an embodiment of the disclosure.

FIG. 4A illustrates an embodiment of a structure of a third antenna module 246 described with reference to FIG. 2, according to an embodiment of the disclosure.

Part (a) of FIG. 4A is a perspective view of the third antenna module 246 viewed from one side, and part (b) of FIG. 4A is a perspective view of the third antenna module 246 viewed from the other side. Part (c) of FIG. 4A is a sectional view taken along X-X' of the third antenna module 246.

Referring to FIG. 4A, according to various embodiments, the third antenna module 246 may include a printed circuit board 410, an antenna array 430, a radio frequency integrated circuit (RFIC) 452, or a power manage integrate circuit (PMIC) 454. Optionally, the third antenna module 246 may further include a shielding member 490. In other embodiments, at least one of the above-mentioned components may be omitted, or at least two of the above-mentioned components may be integrally formed.

The printed circuit board 410 may include a plurality of conductive layers, and a plurality of non-conductive layers alternately stacked with the conductive layers. The printed circuit board 410 may provide an electrical connection between the printed circuit board 410 and/or various electronic components disposed outside by using conductive vias and wires formed in the conductive layers.

An antenna array 430 (e.g., 248 of FIG. 2) may include a plurality of antenna elements 432, 434, 436, or 438 disposed to form a directional beam. The antenna elements 432, 434, 436, or 438 may be disposed on a first surface of the printed circuit board 410 as shown. According to another embodiment, the antenna array 430 may be disposed inside the printed circuit board 410. According to an embodiment, the antenna array 430 may include a plurality of antenna arrays (e.g., a dipole antenna array and/or a patch antenna array) having the same or different shape or type.

The RFIC 452 (e.g., 226 of FIG. 2) may be disposed in another region (e.g., a second surface opposite to the first surface) of the printed circuit board 410 which is spaced apart from the antenna array. The RFIC 452 is configured to process a signal in a selected frequency band, which is transmitted/received through the antenna array 430. According to an embodiment, the RFIC 452 may convert a baseband signal obtained from a communication processor (not shown) into an RF signal in a designated band during transmission. The RFIC 452 may, during reception, convert an RF signal received through the antenna array 430 into a baseband signal to transmit the same to the communication processor.

According to another embodiment, the RFIC 452, may, during transmission, up-convert an IF signal (e.g., about 9 GHz to about 11 GHz) obtained from an intermediate frequency integrate circuit (IFIC) (e.g., 228 of FIG. 2) into an RF signal in a selected band. The RFIC 452 may, during reception, down-convert the RF signal obtained through the antenna array 430 into an IF signal to transmit the same to the IFIC.

The PMIC 454 may be disposed in another partial region (e.g., the second surface) of the printed circuit board 410 which is spaced apart from the antenna array 430. The PMIC may receive a voltage from a main PCB (not shown) to provide power required for various components (e.g., the RFIC 452) on the antenna module.

The shielding member 490 may be disposed on a portion (e.g., the second surface) of the printed circuit board 410 to electromagnetically shield at least one of the RFIC 452 or the PMIC 454. According to an embodiment, the shielding member 490 may include a shield can.

Although not shown, according to various embodiments, the third antenna module 246 may be electrically connected to another printed circuit board (e.g., a main circuit board) through a module interface. The module interface may include a connection member, for example, a coaxial cable connector, a board to board connector, an interposer, or a flexible printed circuit board (FPCB). The RFIC 452 and/or the PMIC 454 of the antenna module may be electrically connected to the printed circuit board through the connection member.

Figure 4B:
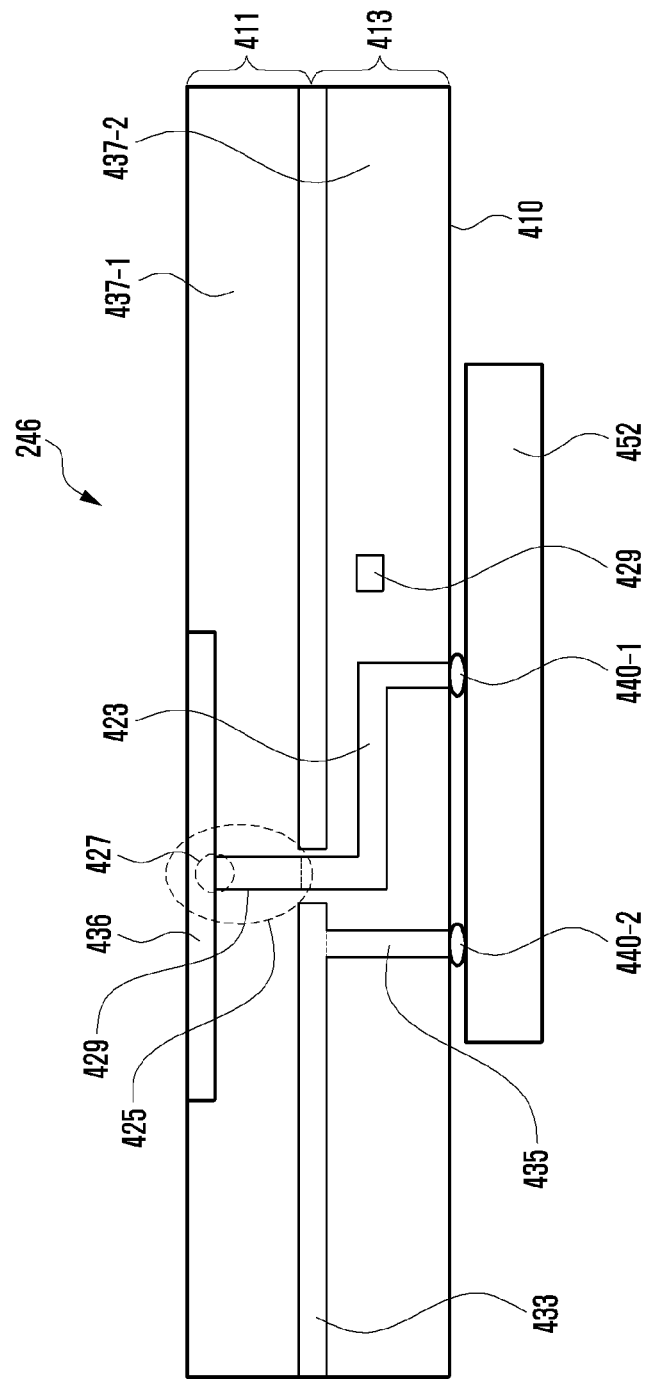
FIG. 4B is a sectional view taken along line Y-Y' of the third antenna module shown in part (a) of FIG. 4A, according to an embodiment of the disclosure.

FIG. 4B illustrates a cross-section taken along line Y-Y' of the third antenna module 246 illustrated in part (a) of FIG. 4A according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a feeding part 425 disposed on or inside the outer surface of the dielectric layer 437-1. The feeding part 425 may include a feeding point 427 and/or a feeding line 429.

The network layer 413 may include at least one dielectric layer 437-2, and at least one ground layer 433, at least one conductive via 435, a transmission line 423, and/or a signal line 429 which are disposed on the outer surface of or inside the dielectric layer 437-1.

In addition, in the illustrated embodiment, the RFIC 452 (e.g., the third RFIC 226 of FIG. 2) shown in part (c) of FIG. 4A may be electrically connected to the network layer 413 through, for example, first and second solder bumps 440-1 and 440-2. In other embodiments, various connection structures (for example, solder or BGA) may be used instead of the solder bumps. The RFIC 452 may be electrically connected to the antenna element 436 through the first solder bump 440-1, the transmission line 423, and the feeding part 425. The RFIC 452 may also be electrically connected to the ground layer 433 through the second solder bump 440-2 and the conductive via 435. Although not shown, the RFIC 452 may also be electrically connected to the above-mentioned module interface through a signal line 429.

Figure 5:
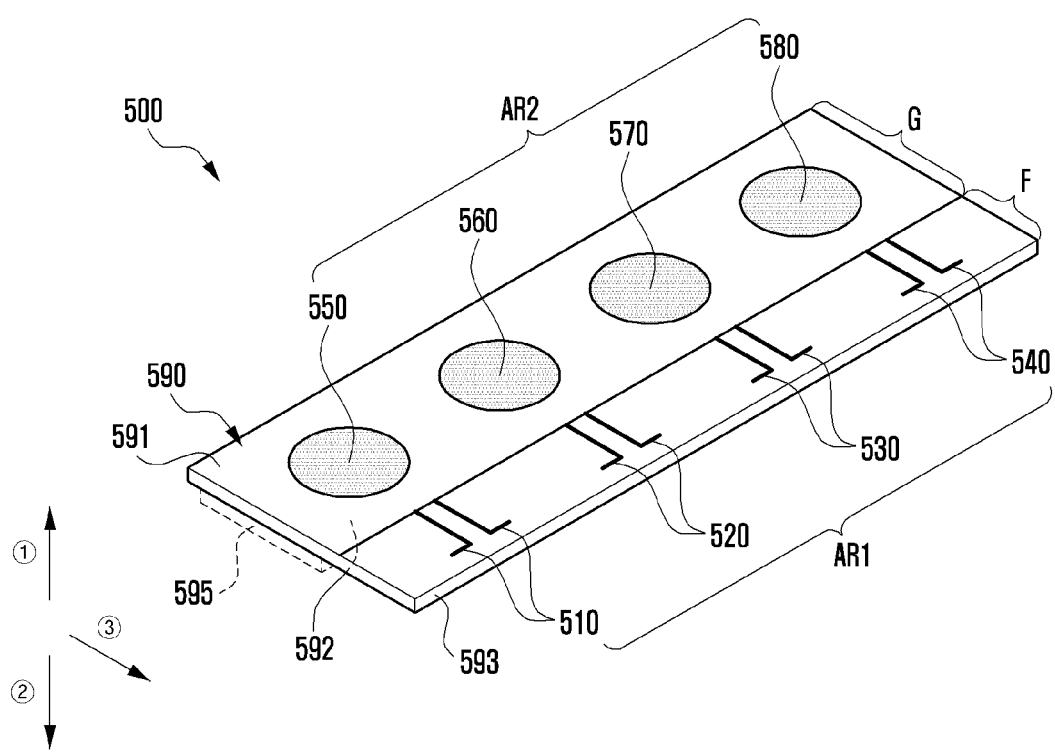
FIG. 5 is a perspective view of an antenna structure according to an embodiment of the disclosure.

FIG. 5 is a perspective view of an antenna structure 500 according to an embodiment of the disclosure.

An antenna module including the antenna structure 500 and the wireless communication circuit 595 of FIG. 5 may be at least partially similar to the third antenna module 246 of FIG. 2, or may further include another embodiment of the antenna module.

Referring to FIG. 5, the antenna structure 500 may include a printed circuit board 590, a first antenna array (AR1) disposed on the printed circuit board 590, and a second antenna array (AR2) disposed near the first antenna array (AR1). According to an embodiment, the printed circuit board 590 may include a first substrate surface 591 facing in a first direction (e.g., direction ☐), a second substrate surface 592 facing in a second direction (e.g., direction ☐) opposite to the direction of the first substrate surface 591, and a substrate side surface 593 surrounding the space between the first substrate surface 591 and the second substrate surface 592. According to an embodiment, the first antenna array (AR1) may include a plurality of conductive patterns 510, 520, 530 and 540, as a plurality of first antenna elements, disposed at a predetermined interval in an inner space between the first substrate surface 591 and the second substrate surface 592 of the printed circuit board 590. According to an embodiment, the first antenna array (AR1) may be disposed in the fill cut region (F) including the dielectric layer of the printed circuit board 590. According to an embodiment, the second antenna array (AR2) may include a plurality of conductive patches 550, 560, 570, and 580, as a plurality of second antenna elements, which are exposed to the first substrate surface 591 of the printed circuit board 590 or disposed closet to the first substrate surface 591 while being disposed in an inner space between the first substrate surface 591 and the second substrate surface 592. According to an embodiment, the second antenna array (AR2) may be disposed in the ground region (G) including the ground layer of the printed circuit board 590. According to an embodiment, the plurality of conductive patterns 510, 520, 530, and 540 may operate as a dipole antenna or a monopole antenna. According to an embodiment, the plurality of conductive patches 550, 560, 570, and 580 may operate as a patch antenna. In another embodiment, the first antenna array (AR1) may also include a plurality of conductive patch antennas having polarization characteristics. In another embodiment, the first antenna array (AR1) may also include conductive patch antennas having polarization characteristics, and a dipole antenna disposed therebetween.

According to various embodiments, the antenna structure 500 may further include a wireless communication circuit 595 which is mounted on the second substrate surface 592 of the printed circuit board 590 and is electrically connected to the first antenna array (AR1) and the second antenna array (AR2). For example, the antenna structure 500 including the wireless communication circuitry 595 may be similar to the third antenna module 246 of FIG. 4A. In another embodiment, the wireless communication circuit 595 may be disposed in the inner space of the electronic device (e.g., the electronic device 300 of FIG. 3A) spaced apart from the antenna structure 500 and be electrically connected to the printed circuit board 590 through an electrical connection member (e.g., an RF coaxial cable or a flexible printed circuit board (FPCB) type RF cable (FRC)).

According to various embodiments, the antenna structure 500 may be disposed in the inner space of the electronic device (e.g., the electronic device 300 of FIG. 3A or 3B) such that a beam pattern is formed in a third direction (e.g., direction ☐) (e.g., a direction in which the substrate side surface 593 faces) perpendicular to a first direction (e.g., direction ☐) through the first antenna array (AR1). According to an embodiment, the third direction (e.g., direction ☐) may include a direction in which a side member of the electronic device (e.g., the electronic device 300) faces. According to an embodiment, the antenna structure 500 may be disposed in the inner space of the electronic device (e.g., the electronic device 300 of FIG. 3A or 3B) such that a beam pattern is formed in the first direction (e.g., direction ☐) through the second antenna array (AR2). According to an embodiment, the first direction (e.g., direction ☐) may include a direction in which the rear cover or the front cover of the electronic device (e.g., the electronic device 300) faces. According to an embodiment, the wireless communication circuit 595 may be configured to transmit and/or receive a wireless signal in a frequency range of about 3 GHz to 100 GHz through the first antenna array (AR1) and/or the second antenna array (AR2).

According to various embodiments, the antenna structure 500 has been illustrated and described as including the second antenna array (AR2) including the plurality of four conductive patches 550, 560, 570, and 580 paired with the first antenna array (AR1) including the plurality of four conductive patterns 510, 520, 530, and 540, but is not limited thereto. For example, the antenna structure 500 may include, as the first antenna array (AR1), a single conductive pattern or two, three, or five or more conductive patterns, and, as a second antenna array (AR2), a single conductive patch or two, three, or five or more conductive patches which are paired therewith.

FIGS. 6A, 6B, 6C, and 6D are examples of beam patterns supported by an antenna module of an electronic device according to various embodiments of the disclosure. For example, FIGS. 6A, 6B, 6C and 6D illustrate the configuration of a stereoscopic (e.g., three-dimensional) electronic device (e.g., the electronic device 300 of FIG. 3A or 3B) in two dimensions, and the vertical axis may indicate the vertical direction (e.g., the y-axis of FIG. 3A) of the electronic device, and the horizontal axis may indicate the front surface (e.g., the first surface 310A of FIG. 3A) and the rear surface (e.g., the second surface 310B of FIG. 3A) of an unfolded electronic device. In the following description, the electronic device may include sixteen beambooks related to four antenna modules (e.g., the antenna modules 330, 332, 334, and 336 of FIG. 3A).

Figure 6A:
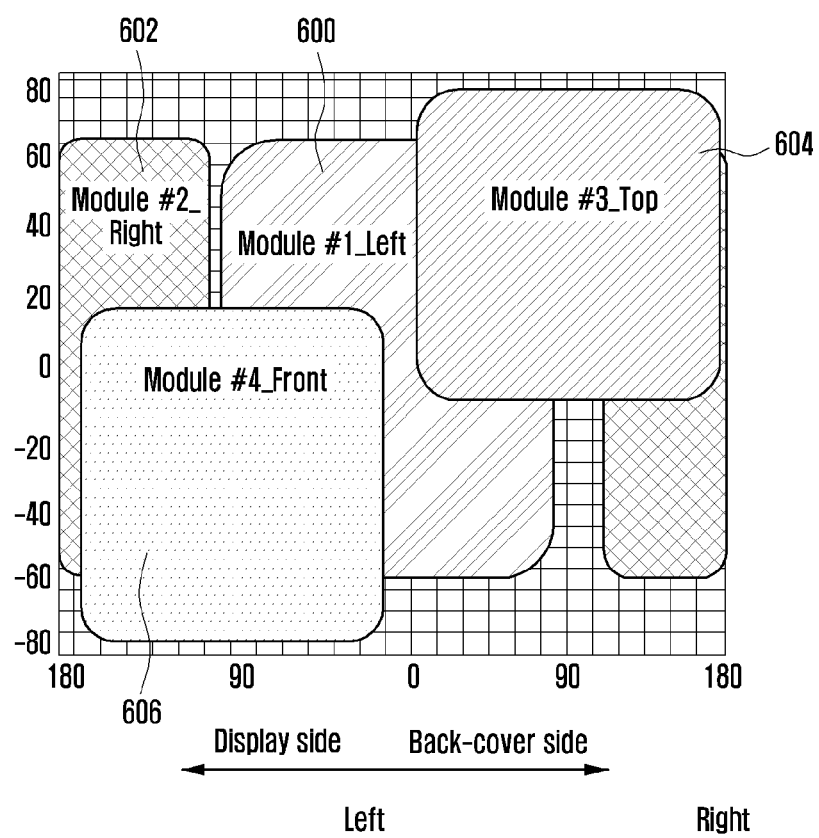

Referring to FIG. 6A, the electronic device 300 may have regions (or antenna modules) in charge, which are separated according to beams (e.g., reception beam) supported thereby. According to an embodiment, at least portion of the region in charge of each beam may overlap with another region. For example, a first region 600 to which a beam (e.g., a reception beam) formed through the first antenna module 330 matches may have at least a portion 610 overlapping with a third region 604 to which a beam (e.g., a reception beam) formed through the third antenna module 334 matches and/or a fourth region 606 to which a beam (e.g., a reception beam) formed through the fourth antenna module 336 matches. For example, a second region 602 to which a beam (e.g., a reception beam) formed through the second antenna module 332 matches may have at least a portion 610 overlapping with the third region 604 to which a beam (e.g., a reception beam) formed through the third antenna module 334 matches and/or a fourth region 606 to which a beam (e.g., a reception beam) formed through the fourth antenna module 336 matches. For example, the third region 604 to which a beam (e.g., a reception beam) formed through the third antenna module 334 matches may have at least a portion 610 overlapping with the first region 600 to which a beam (e.g., a reception beam) formed through the first antenna module 330 matches and/or the second region 602 to which a beam (e.g., a reception beam) formed through the second antenna module 332 matches. For example, the fourth region 606 to which a beam (e.g., a reception beam) formed through the fourth antenna module 336 matches may have at least a portion 610 overlapping with the first region 600 to which a beam (e.g., a reception beam) formed through the first antenna module 330 matches and/or the second region 602 to which a beam (e.g., a reception beam) formed through the second antenna module 332 matches.

Figure 6B:
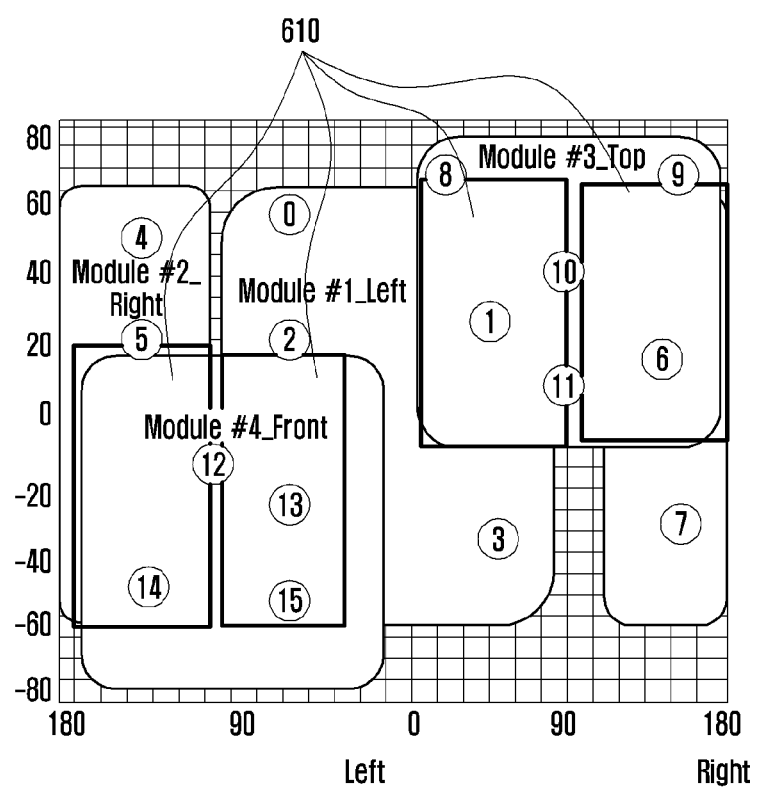

According to various embodiments, in case that the electronic device 300 supports a single beam, referring to FIG. 6B, a beam index having a relatively good received signal power (e.g., reference signal received power (RSRP)) may be matched to each region. For example, beams of indexes 0, 1, 2, and 3 may be matched to the first region 600 to which a beam (e.g., a reception beam) formed through the first antenna module 330 matches. For example, the first antenna module 330 may be driven to receive data through a beam (e.g., a reception beam) of index 0, 1, 2, or 3. For example, beams of indexes 4, 5, 6, and 7 may be matched to the second region 602 to which a beam (e.g., a reception beam) formed through the second antenna module 332 matches. For example, the second antenna module 332 may be driven to receive data through a beam (e.g., a reception beam) of index 4, 5, 6, or 7. For example, beams of indexes 8, 9, 10, and 11 may be matched to the third region 604 to which a beam (e.g., a reception beam) formed through the third antenna module 334 matches. For example, the third antenna module 334 may be driven to receive data through a beam (e.g., a reception beam) of index 8, 9, 10, or 11. For example, beams of indexes 12, 13, 14, and 15 may be matched to the fourth region 606 to which a beam (e.g., a reception beam) formed through the fourth antenna module 336 matches. For example, the fourth antenna module 336 may be driven to receive data through a beam (e.g., a reception beam) of index 12, 13, 14, or 15.

According to various embodiments, in case that data is received through a plurality of beams transmitted from a plurality of transmission nodes (e.g., a transmit-receive point (TRP) or a base station), the electronic device 300 may match such that the beam (e.g., a reception beam) matched to the overlapping region 610 is supported by the plurality of antenna modules.

Figure 6C:
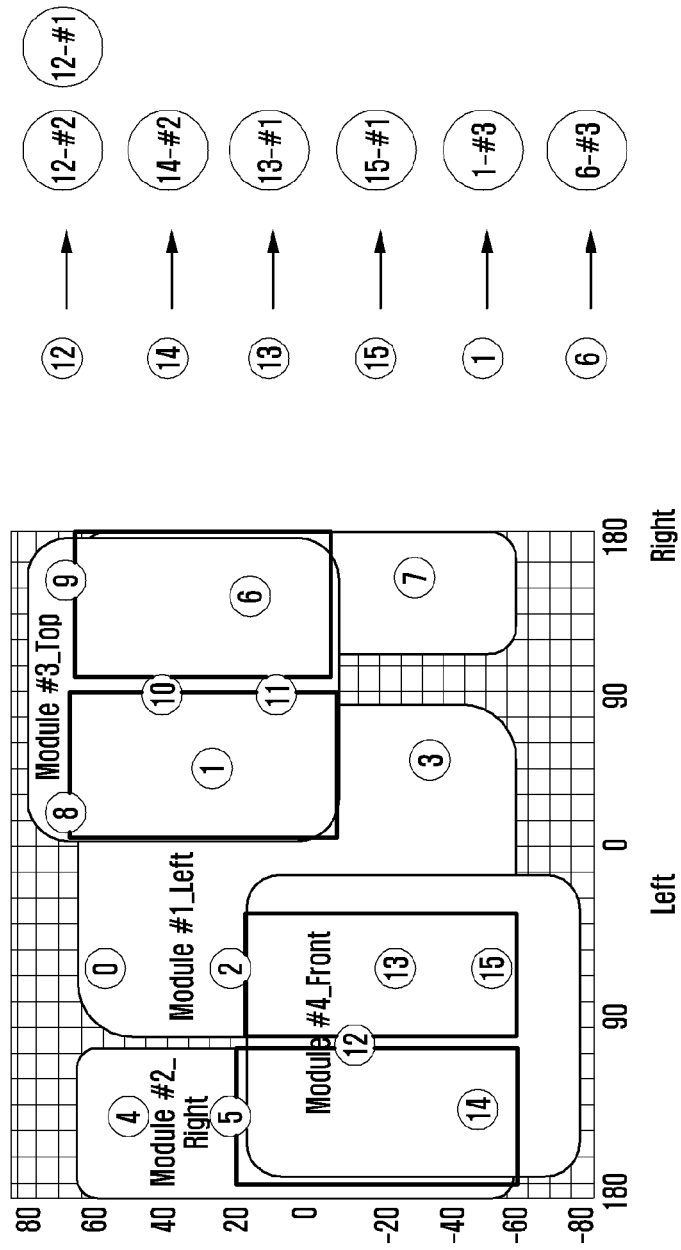

Referring to FIG. 6C, the beam of index 12 may be supported by the first antenna module 330 or the second antenna module 332 as well as the fourth antenna module 336. For example, the beam of index 13 may be supported by the first antenna module 330 as well as the fourth antenna module 336 as shown in FIG. 6C. For example, the beam of index 14 may be supported by the second antenna module 332 as well as the fourth antenna module 336 as shown in FIG. 6C. For example, the beam of index 15 may be supported by the first antenna module 330 as well as the fourth antenna module 336 as shown in FIG. 6C. For example, the beam of index 6 may be supported by the third antenna module 334 as well as the second antenna module 332 as shown in FIG. 6C. For example, the beam of index 1 may be supported by the third antenna module 334 as well as the first antenna module 330 as shown in FIG. 6C. For example, in case that data is received through the beam of index 6 and the beam of index 12, the electronic device 300 may drive the second antenna module 332 and the fourth antenna module 336 or may drive only the second antenna module 332.

Figure 6D:
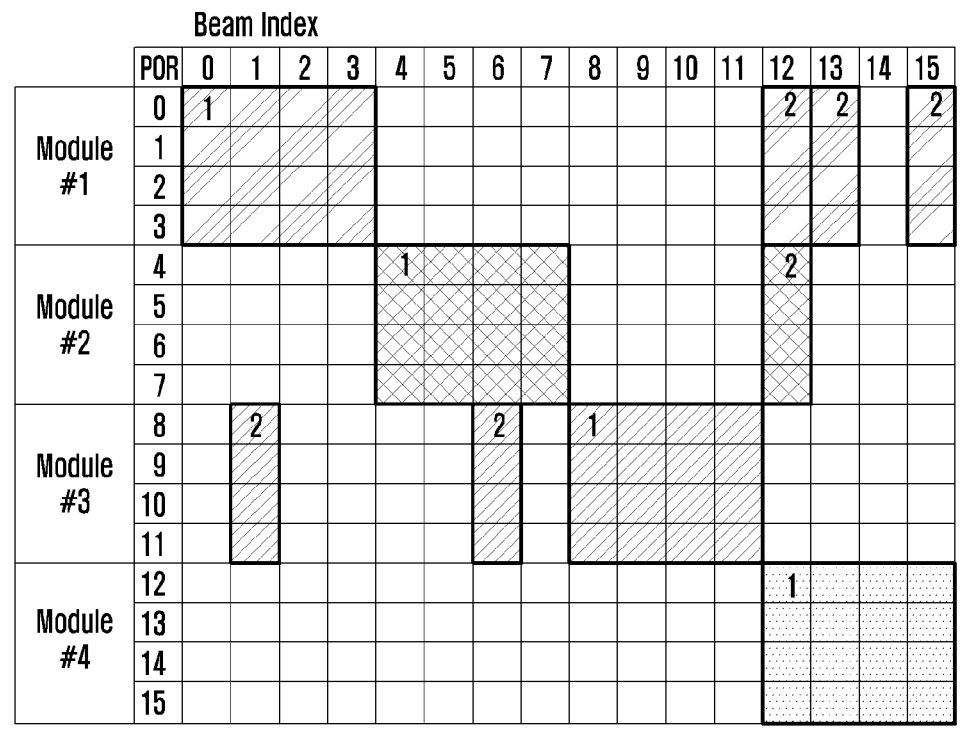

Referring to FIG. 6D, according to an embodiment, the electronic device 300 may identify a beam of an index supported by each antenna module by matching such that the beam matched to the overlapping region 610 is supported by the plurality of antenna modules.

According to an embodiment, the electronic device 300 may configure an index of beam supported by each antenna module (e.g., the antenna modules 330, 332, 334, and 336 of FIG. 3A) as shown in FIG. 6D, and may configure the priority for the beam index, based on the configure index. For example, the first antenna module 330 may support beams of indexes 0 to 3, 12, 13, and 15. In this case, the priority of the beams of indexes 0 to 3 of the first antenna module 330 may be configured to be relatively higher than the priority of the beams of indexes 12, 13, and 15 thereof. For example, the second antenna module 332 may support beams of indexes 4 to 7, and 12. In this case, the priority of the beams of indexes 4 to 7 of the second antenna module 332 may be configured set to be relatively higher than the priority of the beam of index 12. For example, the third antenna module 334 may support beams of indexes 1, 6, and 8 to 11. In this case, the priority of the beams of indexes 8 to 11 of the third antenna module 334 may be configured to be relatively higher than the priority of the beams of index 1 and index 6. For example, the fourth antenna module 336 may support beams of indexes 12 to 15. For example, the priority of the beam may include the order of the beam for preferential processing by the antenna module.

According to various embodiments of the disclosure, an electronic device (e.g., the electronic device 101 of FIG. 1, the electronic device 101 of FIG. 2, the electronic device 300 of FIGS. 3A and 3B, the electronic device 720 of FIGS. 7A and 7B, or the electronic device 800 of FIG. 8) may include a wireless communication circuit (e.g., the wireless communication module 192 of FIG. 1 or the wireless communication circuit 820 of FIG. 8) configured to transmit and receive a wireless signal, a plurality of antenna modules (e.g., the antenna module 197 of FIG. 1 or the antenna modules 832, 834, and 836 of FIG. 8) electrically connected to the wireless communication circuit, and a processor (e.g., the processor 120 of FIG. 1 or the processor 810 of FIG. 8) electrically connected to the wireless communication circuit and the plurality of antenna modules, wherein the processor may receive control information from at least one transmission node by using a first antenna module among the plurality of antenna modules, in case that data is received from a plurality of transmission nodes, based on the control information, select at least one antenna module among the plurality of antenna modules, and form a reception beam, based on the at least one antenna module.

According to various embodiments, the control information may include scheduling information received through a physical downlink control channel (PDCCH) of the at least one transmission node.

According to various embodiments, the processor may determine whether data is received from the plurality of transmission nodes, based on at least one of information related to a radio network temporary identifier (RNTI) descrambling operation included in the scheduling information, information related to antenna port decoding including demodulation reference signal (DMRS) port index information of a downlink control indicator (DCI), or information indicated in a transmission configuration indication (TCI) field.

According to various embodiments, the processor may determine whether data is received from the plurality of transmission nodes, based on the number of the control information received during a predefined period for receiving control information.

According to various embodiments, in case that data is received from the plurality of transmission nodes, the processor may confirm a transmission beam of each transmission node, confirm a reception beam corresponding to the transmission beam of each transmission node, confirm at least two antenna modules supporting the reception beam, among the plurality of antenna modules, select the at least one antenna module from among the at least two antenna modules supporting the reception beam, and form a reception beam, based on the at least one antenna module.

According to various embodiments, the processor may select the at least one antenna module, based on at least one of a data transmission time point, an activation delay time of an antenna module, or a beam switching delay time of an antenna module.

According to various embodiments, the processor may confirm, in case that data is received from the plurality of transmission nodes, a transmission beam of each transmission node, confirm, in case that one antenna module among the plurality of antenna modules is activated, link quality of the transmission beam of each transmission node with respect to a reception beam of the activated one antenna module, select, in case that the link quality of the transmission beam satisfies a specified condition, the activated one antenna module, and form a reception beam, based on the activated one antenna module.

According to various embodiments, in case that the link quality of the transmission beam does not satisfy a specified condition, the processor may select an additional antenna module from among the plurality of antenna modules, and form a reception beam, based on the activated one antenna module and the additional antenna module.

According to various embodiments, the electronic device may further include a sensor module which detects a motion thereof, and the processor may select at least one antenna module to be used for a beam search from among the plurality of antenna modules, based on motion information of the electronic device detected through the sensor module.

According to various embodiments, the processor may confirm a battery state of the electronic device and select at least one antenna module to be used for a beam search from among the plurality of antenna modules, based on the battery state of the electronic device.

According to various embodiments, the processor may include a communication processor or an application processor.

Figure 7A:
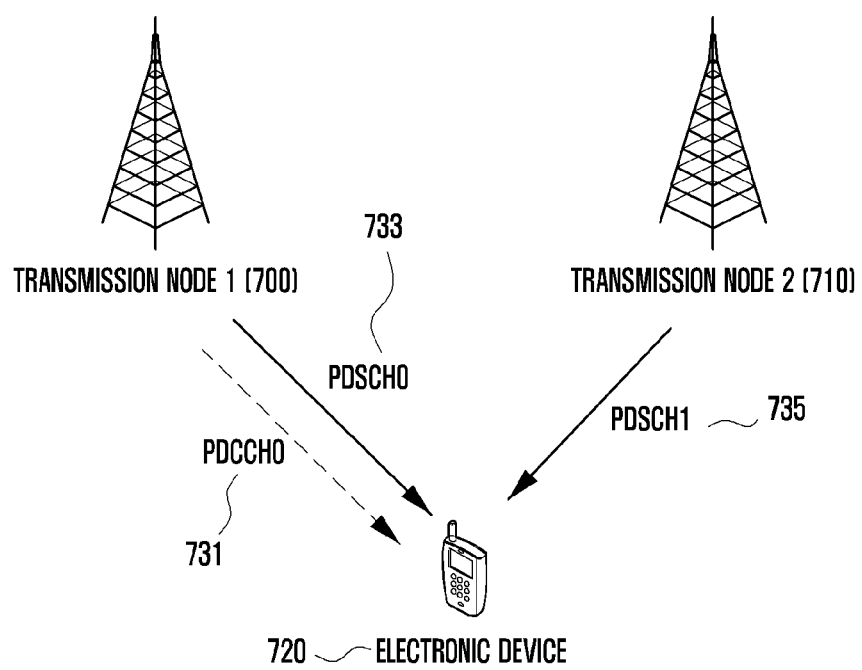
FIGS. 7A and 7B are examples of receiving data in a wireless communication system according to various embodiments of the disclosure.
Figure 7B:
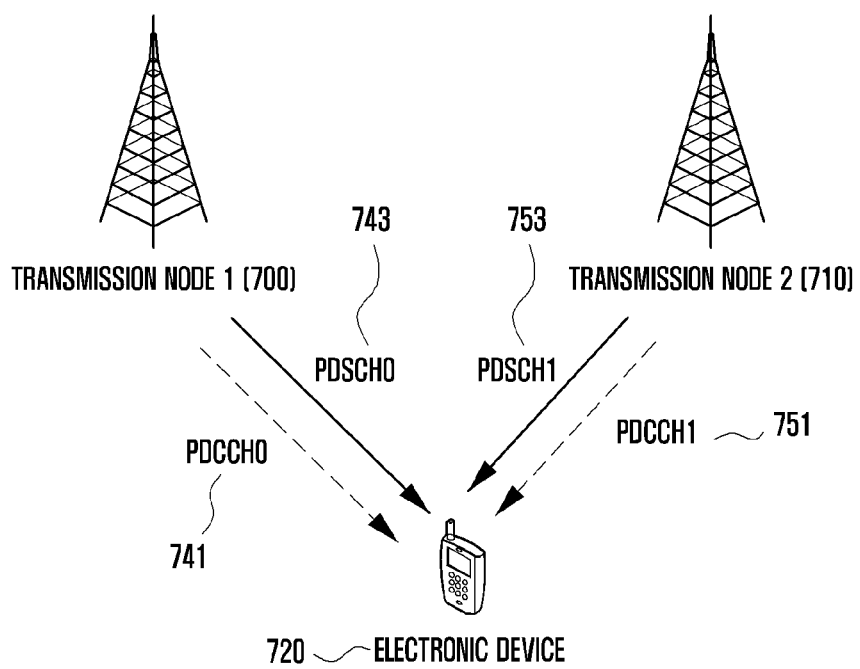

FIGS. 7A and 7B are examples of receiving data in a wireless communication system according to various embodiments of the disclosure. For example, the electronic device 720 of FIG. 7A or 7B may include the electronic device 101 of FIG. 1 or 2 or the electronic device 300 of FIGS. 3A and 3B.

Referring to FIG. 7A, according to various embodiments, the electronic device 720 may receive scheduling information related to joint transmission from transmission node 1 700 (731). According to an embodiment, the electronic device 720 may receive scheduling information related to data transmission of transmission node 1 700 and transmission node 2 710 through PDCCH0 (physical downlink control channel) from transmission node 1 700. For example, the electronic device 720 may receive scheduling information through a first beam (e.g., a reception beam of 0th index of FIG. 6D) supported by the first antenna module (e.g., the first antenna module 330 of FIG. 3A). As an example, the electronic device 720 may include user equipment (UE). For example, transmission node 1 700 and/or transmission node 2 710 may include a transmit-receive point (TRP) or a base station. As an example, the joint transmission may include a transmission method of transmitting data from a plurality of transmission nodes to the electronic device 720 through at least one slot.

According to various embodiments, the electronic device 720 may receive data from transmission node 1 700 and transmission node 2 710, based on the scheduling information related to the joint transmission provided from transmission node 1 700 (733 and 735). According to an embodiment, the electronic device 720 may receive data from transmission node 1 700 and transmission node 2 710 through an identical symbol in an identical slot, based on the scheduling information. According to an embodiment, the electronic device 720 may receive data from transmission node 1 700 and transmission node 2 710 through different symbols in an identical slot, based on the scheduling information. According to an embodiment, the electronic device 720 may receive data from transmission node 1 700 and transmission node 2 710 through different slots, based on the scheduling information. For example, the electronic device 720 may receive data from the transmission node 1 700 through PDSCH0 (physical downlink shared channel) (733). The electronic device 720 may receive data from transmission node 2 710 through PDSCH1 (735). For example, the electronic device 720 may select an antenna module to be used for data reception from among the plurality of antenna modules (e.g., the antenna modules 330, 332, 334, and 336 of FIG. 3A), based on at least one of a beam pattern for data reception, link quality, a data reception time point (or a transmission time point), an activation delay time of an antenna module, or a beam pattern switching delay time of an antenna module. For example, the electronic device 720 may select an antenna module to be used for data reception by additionally considering at least one of a motion state, a battery state, or a heating state of the electronic device 720.

According to various embodiments, transmission node 1 700 and/or transmission node 2 710 may transmit data by adaptive switching between single transmission and joint transmission.

Referring to FIG. 7B, according to various embodiments, the electronic device 720 may receive scheduling information from transmission node 1 700 and transmission node 2 710 (741 and 751). According to an embodiment, the electronic device 720 may receive scheduling information related to data transmission of transmission node 1 700 through PDCCH0 from transmission node 1 700 (741). The electronic device 720 may receive scheduling information related to data transmission of transmission node 2 710 through PDCCH1 from transmission node 2 710 (751). For example, in case that scheduling information is received from transmission node 1 700 and transmission node 2 710 during a period configured for the PDCCH reception, the electronic device 720 may determine that joint transmission by transmission node 1 700 and transmission node 2 710 has been scheduled. For example, the electronic device 720 may receive scheduling information from transmission node 1 700 through a first beam (e.g., a reception beam of 0th index of FIG. 6D) supported by the first antenna module (e.g., the first antenna module 330 of FIG. 3A). As an example, the electronic device 720 may receive scheduling information from transmission node 2 710 through a second beam (e.g., a reception beam of index 1 of FIG. 6D) supported by the second antenna module (e.g., the third antenna module 334 of FIG. 3A).

According to various embodiments, the electronic device 720 may receive data from transmission node 1 700 and transmission node 2 710, based on the scheduling information provided from transmission node 1 700 and transmission node 2 710 (PDSCH0 743 and PDSCH1 753). According to an embodiment, the electronic device 720 may receive data from transmission node 1 700 and transmission node 2 710 through an identical symbol or different symbols in an identical slot, based on the scheduling information. According to an embodiment, the electronic device 720 may receive data from transmission node 1 700 and transmission node 2 710 through symbols different from each other, based on the scheduling information. For example, the electronic device 720 may receive data from the transmission node 1 700 through PDSCH0 and may receive data from transmission node 2 710 through PDSCH1. For example, the electronic device 720 may select an antenna module to be used for receiving data from transmission node 1 700 and/or transmission node 2 710, from among the plurality of antenna modules (e.g., the antenna modules 330, 332, 334, and 336 of FIG. 3A), based on at least one of a beam pattern for data reception, link quality, a data reception time point (or a transmission time point), an activation delay time of an antenna module, or a beam pattern switching delay time of an antenna module. For example, the electronic device 720 may select an antenna module to be used for data reception by additionally considering at least one of a motion state, a battery state, or a heating state of the electronic device 720.

Figure 8:
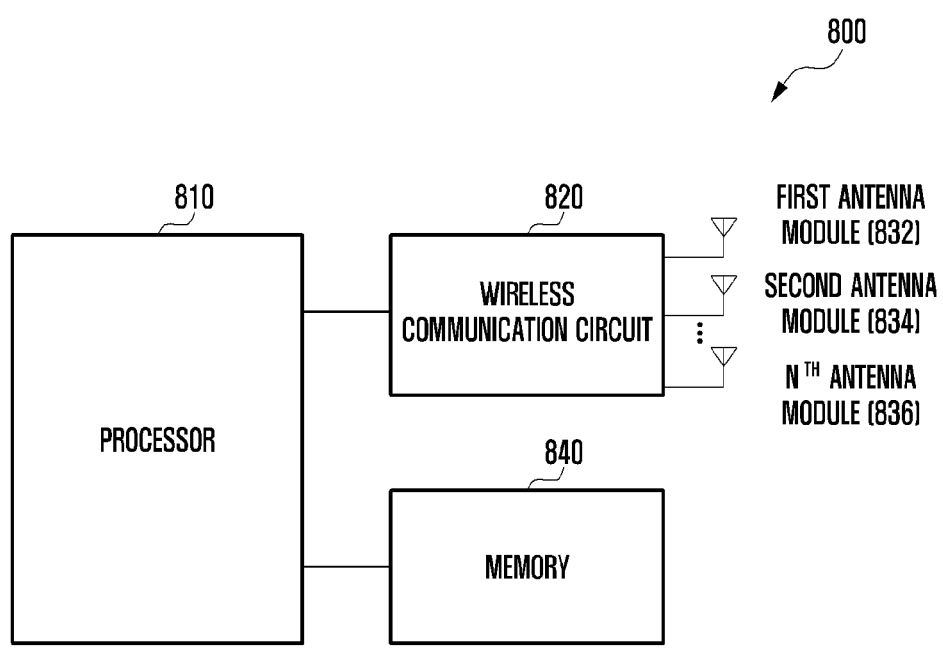
FIG. 8 is a block diagram of an electronic device for controlling an antenna module according to an embodiment of the disclosure.

FIG. 8 is a block diagram of an electronic device for controlling an antenna module according to an embodiment of the disclosure. For example, the electronic device 800 of FIG. 8 may include the electronic device 101 of FIG. 1 or 2, the electronic device 300 of FIGS. 3A and 3B, or the electronic device 720 of FIGS. 7A and 7B.

Referring to FIG. 8, according to various embodiments, the electronic device 800 may include a processor (e.g., including processing circuitry) 810, a wireless communication circuit 820, a plurality of antenna modules 832, 834, and 836, and/or a memory 840. According to an embodiment, the processor 810 may be substantially identical to the processor 120 of FIG. 1 or may be included in the processor 120. The wireless communication circuit 820 may be substantially identical to the wireless communication module 192 of FIG. 1 or may be included in the wireless communication module 192. The plurality of antenna modules 832, 834, and 836 may be substantially identical to the antenna module 197 of FIG. 1 or may be included in the antenna module 197. The memory 840 may be substantially identical to the memory 130 of FIG. 1 or may be included in the memory 130. For example, the processor 810 may include a communication processor (CP) or an application processor (AP).

According to various embodiments, the processor 810 may receive configuration information related to joint transmission from a transmission node. According to an embodiment, the processor 810 may receive at least one of information related to whether to joint transmission (e.g., non-coherent-joint transmission (NC-JT)) is supported or information related to activation of joint transmission, through radio resource control (RRC) establishment with a transmission node or media access control (MAC) control element (CE).

According to various embodiments, the processor 810 may activate at least one antenna module 832, 834, or 836 to measure a channel with a transmit node (e.g., transmit node 1 700 and/or transmit node 2 710 of FIG. 7A). According to an embodiment, the processor 810 may periodically activate at least one antenna module 832, 834, or 836 to measure, through a beam search, channel states of reception beams with respect to transmission beams of transmission nodes. The processor 810 may update the channel state information of the reception beam related to the transmission beam stored in the memory 840, based on the channel state information. For example, the channel state information may include at least one of a beam measurement value, reference signal received power (L1-RSRP) of a physical layer, or a signal to interference and noise ratio (L1-SINR) of a physical layer.

According to an embodiment, in case that the electronic device 800 supports joint transmission with a plurality of transmission nodes, the processor 810 may perform a beam search through at least one antenna module, based on motion information of the electronic device 800. For example, in case that the motion of the electronic device 800 exceeds a reference value, the processor 810 may perform a beam search through the plurality of antenna modules to improve beamforming accuracy. For example, in case that a beam search period arrives, the processor 810 may perform a beam search for the plurality of transmission nodes (e.g., transmission node 1 700 and transmission node 2 710 of FIG. 7A) through the plurality of antenna modules (e.g., the first antenna module 330 and the third antenna module 334 of FIG. 3A). For example, the situation in which the motion of the electronic device 800 exceeds the reference value may include one of a state in which the electronic device 800 is gripped by a user, a state in which the electronic device 800 rotates, or a state in which the electronic device 800 moves relatively quickly. For example, in case that the motion of the electronic device 800 is equal to or less than the reference value, the processor 810 may perform a beam search through at least one antenna module. For example, in case that a beam search period arrives, the processor 810 may perform a beam search for the plurality of transmission nodes (e.g., transmission node 1 700 and transmission node 2 710 of FIG. 7A) through at least one antenna module (e.g., the first antenna module 330 of FIG. 3A). As an example, the situation in which the motion of the electronic device 800 is less than or equal to the reference value may include one of a state in which the electronic device 800 is mounted, a state in which the motion of a user gripping the electronic device 800 is not detected, or a state in which rotation of the electronic device 800 is restricted.

According to an embodiment, in case the electronic device 800 supports joint transmission with a plurality of transmission nodes, the processor 810 may perform a beam search for at least one transmission node, based on motion information of the electronic device 800. For example, in case that the motion of the electronic device 800 exceeds a reference value, the processor 810 may perform a beam search for transmission node 1 (e.g., transmission node 1 700 of FIG. 7A) and transmission node 2 (e.g., transmission node 2 710 of FIG. 7A) to improve beamforming accuracy. For example, in case that the motion of the electronic device 800 is equal to or less than the reference value, the processor 810 may perform a beam search for a reference transmission node among the plurality of transmission nodes (e.g., transmission node 1 700 and transmission node 2 710 of FIG. 7A).

According to an embodiment, in case that the electronic device 800 supports joint transmission with a plurality of transmission nodes, the processor 810 may perform a beam search through at least one antenna module, based on a battery state (e.g., a remaining battery power amount or a charging status) of the electronic device 800. For example, in case that the battery state of the electronic device 800 satisfies a reference battery state, the processor 810 may perform a beam search through the plurality of antenna modules. For example, in case that a beam search period arrives, the processor 810 may perform a beam search for the plurality of transmission nodes (e.g., transmission node 1 700 and transmission node 2 710 of FIG. 7A) through the plurality of antenna modules (e.g., the first antenna module 330 and the third antenna module 334 of FIG. 3A). For example, the situation in which the battery state of the electronic device 800 satisfies the reference battery state may include at least one of a state in which the remaining battery power amount of the electronic device 800 exceeds a reference battery power amount or a state in which the electronic device 800 is connected to an external power source. For example, in case that the battery state of the electronic device 800 does not satisfy the reference battery state, the processor 810 may perform a beam search through at least one antenna module. For example, in case that a beam search period arrives, the processor 810 may perform a beam search for the plurality of transmission nodes (e.g., transmission node 1 700 and transmission node 2 710 of FIG. 7A) through at least one antenna module (e.g., the first antenna module 330 of FIG. 3A). As an example, the situation in which the battery state of the electronic device 800 does not satisfy the reference battery state may include at least one of a state in which the remaining battery power amount of the electronic device 800 is equal to or less than the reference battery power amount or a state in which the electronic device 800 is not connected to an external power source.

According to an embodiment, in case that the electronic device 800 supports joint transmission with the plurality of transmission nodes, the processor 810 may perform a beam search for at least one transmission node, based on a battery state (e.g., a remaining battery power amount or a charging status) of the electronic device 800. For example, in case that the battery state of the electronic device 800 satisfies a reference battery state, the processor 810 may perform a beam search for transmission node 1 (e.g., transmission node 1 700 of FIG. 7A) and transmission node 2 (e.g., transmission node 2 710 of FIG. 7A) to improve beamforming accuracy. For example, in case that the battery state of the electronic device 800 does not satisfy the reference battery state, the processor 810 may perform a beam search for a reference transmission node (e.g., transmission node 1 700 or transmission node 2 710) among the plurality of transmission nodes (e.g., transmission node 1 700 and transmission node 2 710 of FIG. 7A).

According to an embodiment, in case that a beam search is performed, the processor 810 may control at least one antenna module 832, 834, or 836 such that the at least one antenna module 832, 834, or 836 to be used for a beam search is activated, based on beam information of an index supported by each antenna module 832, 834, or 836 which is mapped as shown in FIG. 6D. For example, in case that the first antenna module 330 is activated through a beam search, the processor 810 may control the antenna modules 832, 834, and/or 836 such that channel states for beams of indexes 0 to 3, 12, 13, and 15 are sequentially measured through the first antenna module 330. As another example, in case that a beam search related to a beam of index 12, the processor 810 may control the antenna modules 832, 834, and/or 836 such that the fourth antenna module 336, the first antenna module 330, and the second antenna module 332 are sequentially activated.

According to various embodiments, in case that scheduling related to joint transmission is confirmed, the processor 810 may control the antenna modules 832, 834, or 836 such that at least one antenna module 832, 834, or 836 for receiving data from the plurality of transmission nodes (e.g., transmission node 1 700 and transmission node 2 710 of FIG. 7A) is activated.

According to an embodiment, the processor 810, as shown in FIG. 7A, may receive scheduling information related to joint transmission from transmission node 1 700 through a first beam (e.g., a reception beam of 0th index of FIG. 6D) supported by the first antenna module (e.g., the first antenna module 330 of FIG. 3A). In this case, the processor 810 may control the antenna modules 832, 834, or 836 such that an additional antenna module for receiving data from transmission node 1 700 and transmission node 2 710 is activated. As an example, the additional antenna module may include an antenna module supporting a reception beam corresponding to a transmission beam of transmission node 1 700 and/or transmission node 2 710. For example, in case that data is transmitted through a specific transmission beam of a transmission node, a reception beam corresponding to a transmission beam may be selected as a reception beam (or a reception beam pattern) having an optimal channel state, based on the channel state information measured through a beam search.

According to an embodiment, as shown in FIG. 7A, in case that scheduling information related to joint transmission is received from the transmission node 1 700 through the first antenna module (e.g., the first antenna module 330 of FIG. 3A), the processor 810 may select at least one antenna module 832, 834, or 836 to be used for receiving data from transmission node 1 700 and/or transmission node 2 710, based on at least one of a beam pattern (e.g., a reception beam pattern) for data reception, link quality, a reception time point (or a transmission time point) of data, an activation delay time of an antenna module, or a beam pattern switching delay time of an antenna module. For example, in case that the first antenna module (e.g., the first antenna module 330 of FIG. 3A) is selected for data reception, the processor 810 may control the first antenna module such that a beam pattern is switched, based on a data reception time point (or a transmission time point). For example, in case that a plurality of antenna modules including the first antenna module are selected for data reception, the processor 810 may control the antenna modules 832, 834, or 836 such that an additional antenna module is activated.

According to an embodiment, in case that an error occurs in data received from the plurality of transmission nodes by using one antenna module 832, 834, or 836, the processor 810 may control the antenna modules 832, 834, or 836 such that a plurality of antenna modules for receiving data from the plurality of transmission nodes are activated.

Referring to FIG. 7B, in case that scheduling information is received from transmission node 1 700 and transmission node 2 710 during a period configured for PDCCH reception, the processor 810 may determine that the joint transmission by transmission node 1 700 and transmission node 2 710 has been scheduled. For example, the processor 810 may receive data from transmission node 1 700 and transmission node 2 710 through the plurality of antenna modules 832, 834, or 836 used to receive scheduling information. For example, the processor 810 may select the plurality of antenna modules 832, 834, or 836 for data reception, based on the transmission beams of transmission node 1 700 and transmission node 2 710. The processor 810 may receive data from transmission node 1 700 and transmission node 2 710 through the plurality of antenna modules 832, 834, or 836 selected for data reception.

According to various embodiments, the processor 810 may control the antenna modules 832, 834, or 836 such that at least one antenna module 832, 834, or 836 used for data reception is deactivated. According to an embodiment, the processor 810 may confirm whether the transmission node switches a transmission method to single transmission in a state in which the plurality of antenna modules are activated based on joint transmission. In case that the transmission method of the transmission node is switched to single transmission, the processor 810 may select one antenna module for single transmission from among the plurality of antenna modules activated for joint transmission. For example, the processor 810 may select an antenna module for single transmission, based on at least one of heating information or reception sensitivity of the antenna module. For example, among the plurality of antenna modules activated for joint transmission, the remaining antenna modules except for one antenna module for single transmission may be deactivated. For example, in case that data is not received from the plurality of transmission nodes for a reference time, the processor 810 may determine that the transmission method of the transmission node is switched to single transmission. For example, in case that scheduling information related to single transmission is received from the transmission node (e.g., transmission node 1 700 of FIG. 7A), the processor 810 may determine that the transmission method of the transmission node is switched to single transmission.

According to an embodiment, in case that the plurality of antenna modules are activated based on an error occurrence during joint transmission, the processor 810 may control the antenna modules 832, 834, or 836 such that at least one antenna module is deactivated based on the completion of reception of erroneous data. For example, the processor 810 may select at least one antenna module for communication with a transmission node from among the plurality of antenna modules, based on at least one of a reference antenna module, reception sensitivity of the antenna module, or heating information. For example, at least one unselected antenna module among the plurality of antenna modules may be deactivated.

According to various embodiments, the wireless communication circuit 820 may transmit/receive a signal to/from an external electronic device through at least one network (e.g., a 5G network). According to an embodiment, the wireless communication circuit 820 may include a radio frequency integrated circuit (RFIC) and a radio frequency front end (RFFE). For example, the RFIC may convert a baseband signal provided from the processor 810 (e.g., a communication processor) into a radio signal or convert a radio signal provided from the RFFE into a baseband signal. For example, the RFFE may include processing for receiving or transmitting a signal through at least one antenna module 832, 834, or 836. For example, the RFFE may include an element for amplifying signal power or an element for removing noise.

According to various embodiments, the antenna modules 832, 834, and 836 may transmit and/or receive a signal in a frequency band supported by at least one network (e.g., a 5G network). According to an embodiment, at least one of the antenna modules 832, 834, and 836 may be configured as for the third antenna module 246 of FIG. 4A or the antenna structure 500 of FIG. 5. According to an embodiment, in case that the antenna modules 832, 834, and 836 are activated under the control of the processor 810, the antenna modules 832, 834, and 836 may maintain an active state until data reception is completed. According to an embodiment, in case that the antenna modules 832, 834, and 836 are activated under the control of the processor 810, the antenna modules 832, 834, and 836 may maintain an active state from the time at which data reception is started until a reference time elapses.

According to various embodiments, the memory 840 may store data related to driving of the electronic device 800. For example, the memory 840 may store channel state information measured through a beam search.

According to various embodiments, the electronic device 800 may further include a sensor module (not shown) for detecting a motion of the electronic device 800. According to an embodiment, the sensor module may include a motion sensor for detecting a motion of the electronic device 800 (or a user). For example, the motion sensor may include at least one of an acceleration sensor, a tilt sensor, a gyro sensor, and a magnetic field sensor (a 3-axis magnetic sensor).

Figure 9:
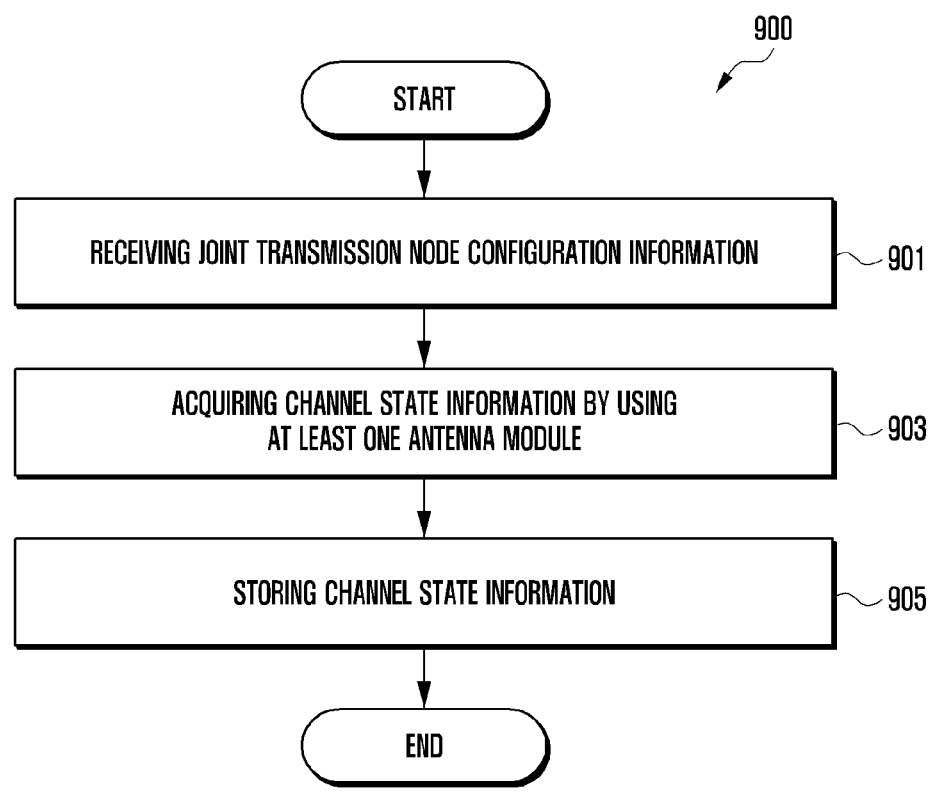
FIG. 9 is a flowchart for confirming channel state information in an electronic device according to an embodiment of the disclosure.

FIG. 9 is a flowchart 900 for confirming channel state information in an electronic device according to an embodiment of the disclosure. In the following embodiment, the respective operations may be sequentially performed, but are not necessarily performed sequentially. For example, the order of each operation may be changed, and at least two operations may be performed in parallel. For example, the electronic device of FIG. 9 may include the electronic device 101 of FIG. 1 or 2, the electronic device 300 of FIGS. 3A and 3B, the electronic device 720 of FIGS. 7A and 7B, or the electronic device 800 of FIG. 8.

Referring to FIG. 9, according to various embodiments, the electronic device (e.g., the processor 120 of FIG. 1 or the processor 810 of FIG. 8) may receive configuration information related to joint transmission in operation 901. According to an embodiment, the processor 810 may receive configuration information related to joint transmission (e.g., non coherent-joint transmission (NC-JT)) through RRC establishment with a transmission node (e.g., transmission node 1 700 of FIG. 7A) or MAC CE. For example, the configuration information related to joint transmission may include at least one of information related to whether joint transmission is supported, or information related to activation of joint transmission.

According to various embodiments, in operation 903, the electronic device (e.g., the processor 120 or 810) may acquire channel state information on a beam transmitted from a transmission node through at least one antenna module. According to an embodiment, in case that a period in which a reference signal for channel measurement is transmitted from a transmission node arrives, the processor 810 may activate at least one antenna module to measure channel states of reception beams with respect to transmission beams of the transmission nodes (e.g., transmission node 1 700 and/or transmission node 2 710 of FIG. 7A). That is, the processor 810 may perform a beam search by periodically activating at least one antenna module. For example, the processor 810 may perform a beam search through a plurality of antenna modules or at least one antenna module, based on at least one of motion information or battery state information of the electronic device 800. For example, the processor 810 may perform a beam search for at least one transmission node among a plurality of transmission nodes, based on at least one of motion information or battery state information of the electronic device 800.

According to various embodiments, in operation 905, the electronic device (e.g., the processor 120 or 810) may store, in a memory (e.g., the memory 840 of FIG. 8), channel state information measured through at least one antenna module. According to an embodiment, the processor 810 may store, in the memory 840, channel state information of a reception beam corresponding to a transmission beam of a transmission node (e.g., transmission node 1 700 and/or transmission node 2 710 of FIG. 7A) obtained through a beam search. In addition, the processor 810 may control the wireless communication circuit 820 such that channel state information of a reception beam corresponding to a transmission beam of a transmission node (e.g., transmission node 1 700 of FIG. 7A) to the transmission node (e.g., transmission node 1 700 of FIG. 7A). For example, the channel state information may include at least one of a beam measurement value, reference signal received power (L1-RSRP) of a physical layer, or a signal to interference and noise ratio (L1-SINR) of a physical layer.

Figure 10:
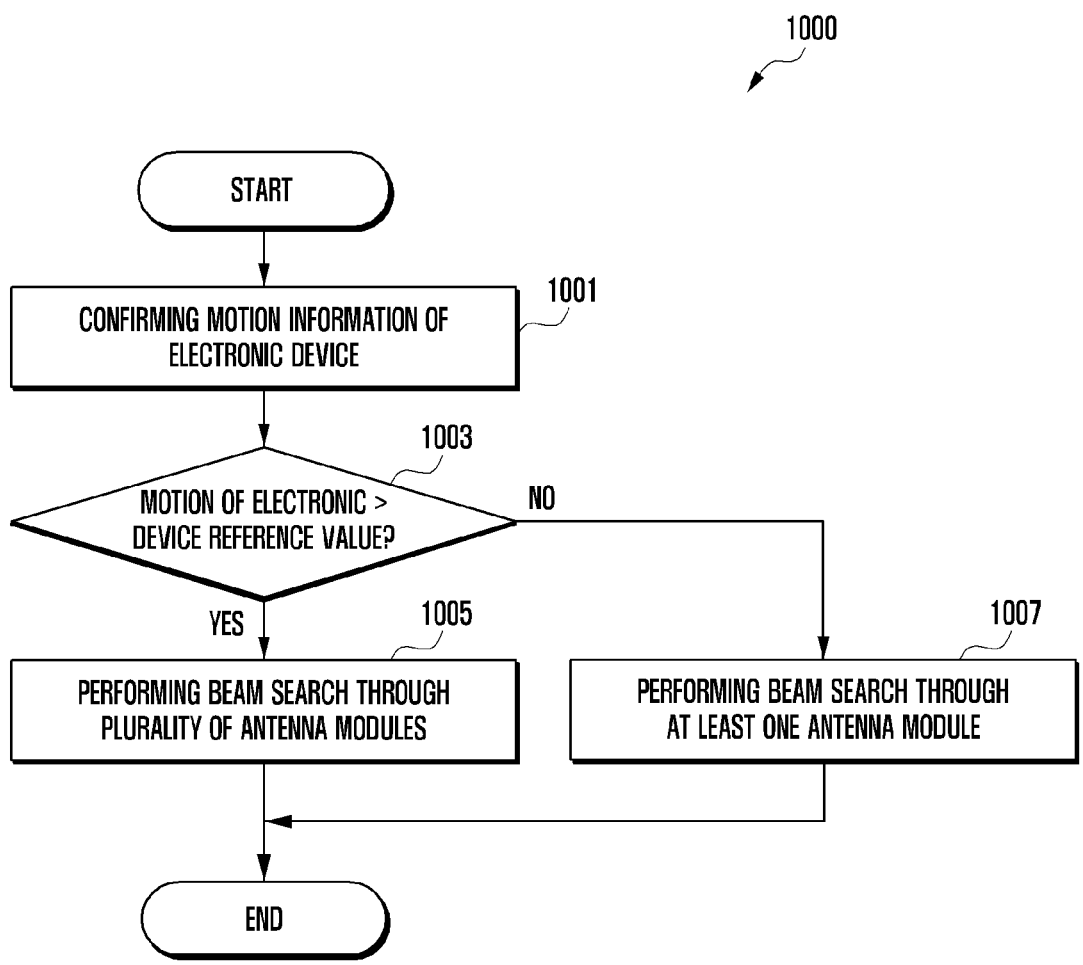
FIG. 10 is a flowchart for performing a beam search, based on motion information in an electronic device according to an embodiment of the disclosure.

FIG. 10 is a flowchart 1000 for performing a beam search, based on motion information in an electronic device according to an embodiment of the disclosure. According to an embodiment, the operations of FIG. 10 may be detailed operations of operation 903 of FIG. 9. In the following embodiment, the respective operations may be sequentially performed, but are not necessarily performed sequentially. For example, the order of each operation may be changed, and at least two operations may be performed in parallel. For example, the electronic device of FIG. 10 may include the electronic device 101 of FIG. 1 or 2, the electronic device 300 of FIGS. 3A and 3B, the electronic device 720 of FIGS. 7A and 7B, or the electronic device 800 of FIG. 8.

Referring to FIG. 10, according to various embodiments, in operation 1001, the electronic device (e.g., the processor 120 of FIG. 1 or the processor 810 of FIG. 8) may confirm motion information of the electronic device (e.g., the electronic device 800 of FIG. 8). According to an embodiment, the processor 810 may confirm (or estimate) motion information of the electronic device 800, based on sensing information detected through a sensor module (e.g., a motion sensor) or a change in a channel state measured through the wireless communication circuit 820.

According to various embodiments, in operation 1003, the electronic device (e.g., the processor 120 or 810) may confirm whether a change in the motion of the electronic device (e.g., the electronic device 800 of FIG. 8) exceeds a reference value. For example, the reference value is a reference value for configuring an antenna module to be used for a beam search, based on motion information of the electronic device 800, and may be fixed or changed based on to state information (e.g., load or battery information) of the electronic device 800.

According to various embodiments, in case that the change in the motion of the electronic device (e.g., the electronic device 800 of FIG. 8) exceeds the reference value (e.g., "Yes" in operation 1003), the electronic device (e.g., the processor 120 or 810) may perform a beam search corresponding to a plurality of transmission nodes for joint transmission through a plurality of antenna modules in operation 1005. According to an embodiment, in case that the change in the motion of the electronic device 800 exceeds the reference value, the processor 810 may determine that motion of the electronic device 800 is relatively excessive. In this case, the processor 810 may perform, through a plurality of antenna modules, a beam search for a plurality of transmission nodes used for joint transmission, thereby improving beamforming accuracy. For example, the processor 810 may control the antenna modules 832, 834, and/or 836 such that the plurality of antenna modules 832, 834, and/or 836 are activated, thereby performing a beam search based on beam information provided from transmission node 1 700 and transmission node 2 710 of FIG. 7A.

According to various embodiments, in case that the change in motion of the electronic device (e.g., the electronic device 800 of FIG. 8) is less than or equal to a reference value (e.g., "No" in operation 1003), the electronic device (e.g., the processor 120 or 810) may perform a beam search corresponding to a plurality of transmission nodes for joint transmission through at least one antenna module in operation 1007. According to an embodiment, in case that the change in the motion of the electronic device 800 is equal to or less than the reference value, the processor 810 may determine that the motion of the electronic device 800 is relatively low. In this case, the processor 810 may perform, through at least one antenna module, a beam search for a plurality of transmission nodes used for joint transmission, thereby reducing resource consumed by the beam search. For example, the processor 810 may control may the antenna modules 832, 834, and/or 836 such that at least one antenna module 832, 834, or 836 is activated, thereby performing a beam search based on beam information provided from transmission node 1 700 and transmission node 2 710 of FIG. 7A.

According to various embodiments, in case that the electronic device 800 supports joint transmission with a plurality of transmission nodes, the electronic device 800 may perform a beam search for at least one transmission node, based on motion information of the electronic device 800. According to an embodiment, in case that the motion of the electronic device 800 exceeds a reference value, the processor 810 may perform a beam search for transmission node 1 700 and transmission node 2 710 to improve beamforming accuracy. For example, in case that the motion of the electronic device 800 is equal to or less than the reference value, the processor 810 may perform a beam search for one transmission node (e.g., transmission node 1 700 or transmission node 2 710) of transmission node 1 700 and transmission node 2 710.

Figure 11:
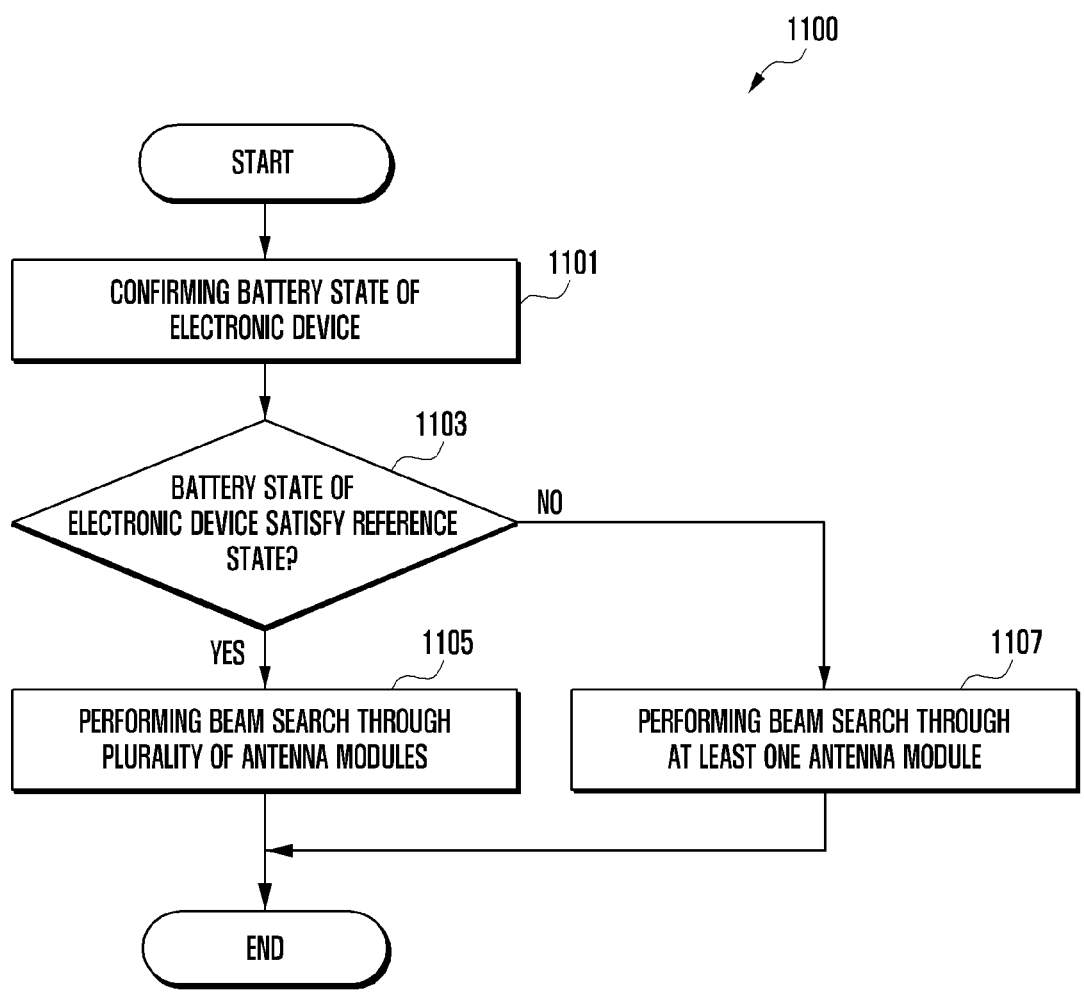
FIG. 11 is a flowchart for performing a beam search, based on a battery state in an electronic device according to an embodiment of the disclosure.

FIG. 11 is a flowchart 1100 for performing a beam search, based on a battery state in an electronic device according to an embodiment of the disclosure. According to an embodiment, the operations of FIG. 11 may be detailed operations of operation 903 of FIG. 9. In the following embodiment, the respective operations may be sequentially performed, but are not necessarily performed sequentially. For example, the order of each operation may be changed, and at least two operations may be performed in parallel. For example, the electronic device of FIG. 11 may include the electronic device 101 of FIG. 1 or 2, the electronic device 300 of FIGS. 3A and 3B, the electronic device 720 of FIGS. 7A and 7B, or the electronic device 800 of FIG. 8.

Referring to FIG. 11, according to various embodiments, the electronic device (e.g., the processor 120 of FIG. 1 or the processor 810 of FIG. 8) may confirm a battery state of the electronic device (e.g., the electronic device 800 of FIG. 8) in operation 1101. As an example, the battery state of the electronic device 800 may include at least one of a remaining battery power amount and a charging status (e.g., whether it is charged or discharged) of the electronic device 800.

According to various embodiments, in operation 1103, the electronic device (e.g., the processor 120 or 810) may determine whether the battery state of the electronic device (e.g., the electronic device 800 of FIG. 8) satisfies a reference state information. For example, the reference state information is a reference value for configuring an antenna module to be used for a beam search, based on the battery state of the electronic device 800, and may include at least one of a reference remaining battery power amount or connection information with an external power source (e.g., charging state information).

According to various embodiments, in case that the battery state of the electronic device (e.g., the electronic device 800 of FIG. 8) satisfies a reference state (e.g., "Yes" in operation 1103), in operation 1105, the electronic device (e.g., the processor 120 or 810) may perform a beam search corresponding to a plurality of transmission nodes for joint transmission through a plurality of antenna modules. According to an embodiment, in case that the electronic device 800 has the remaining battery power amount exceeding a reference battery power amount or is connected to an external power source, the processor 810 may perform a beam search through a plurality of antenna modules to improve beamforming accuracy. For example, the processor 810 may control the antenna modules 832, 834, and/or 836 such that the plurality of antenna modules 832, 834, and/or 836 are activated, thereby performing a beam search based on beam information provided from transmission node 1 700 and transmission node 2 710 of FIG. 7A.

According to various embodiments, in case the battery state of the electronic device (e.g., the electronic device 800 of FIG. 8) does not satisfy the reference state (e.g., "No" in operation 1103), in operation 1107, the electronic device (e.g., the processor 120 or 810) may perform a beam search corresponding to a plurality of transmission nodes for joint transmission through at least one antenna module. According to an embodiment, in case that the electronic device 800 has the remaining battery power amount less than or equal to the reference battery power amount and is not connected to an external power source, the processor 810 may perform, through at least one antenna module, a beam search for a plurality of transmission nodes used for joint transmission, thereby reducing resource consumed by the beam search. For example, the processor 810 may control the antenna modules 832, 834, and/or 836 such that at least one antenna module 832, 834, or 836 is activated, thereby performing a beam search based on beam information provided from transmission node 1 700 and transmission node 2 710 of FIG. 7A.

According to various embodiments, in case that the electronic device 800 supports joint transmission with a plurality of transmission nodes, the electronic device 800 may perform a beam search for at least one transmission node, based on the battery state (e.g., a remaining battery power amount or a charge status) of the electronic device 800. For example, in case that the battery state of the electronic device 800 satisfies the reference battery state, the processor 810 may perform a beam search for transmission node 1 700 and transmission node 2 710 to improve beamforming accuracy. For example, in case that the battery state of the electronic device 800 does not satisfy the reference battery state, the processor 810 may perform a beam search for one transmission node (e.g., transmission node 1 700 or transmission node 2 710) of transmission node 1 700 and transmission node 2 710.

Figure 12:
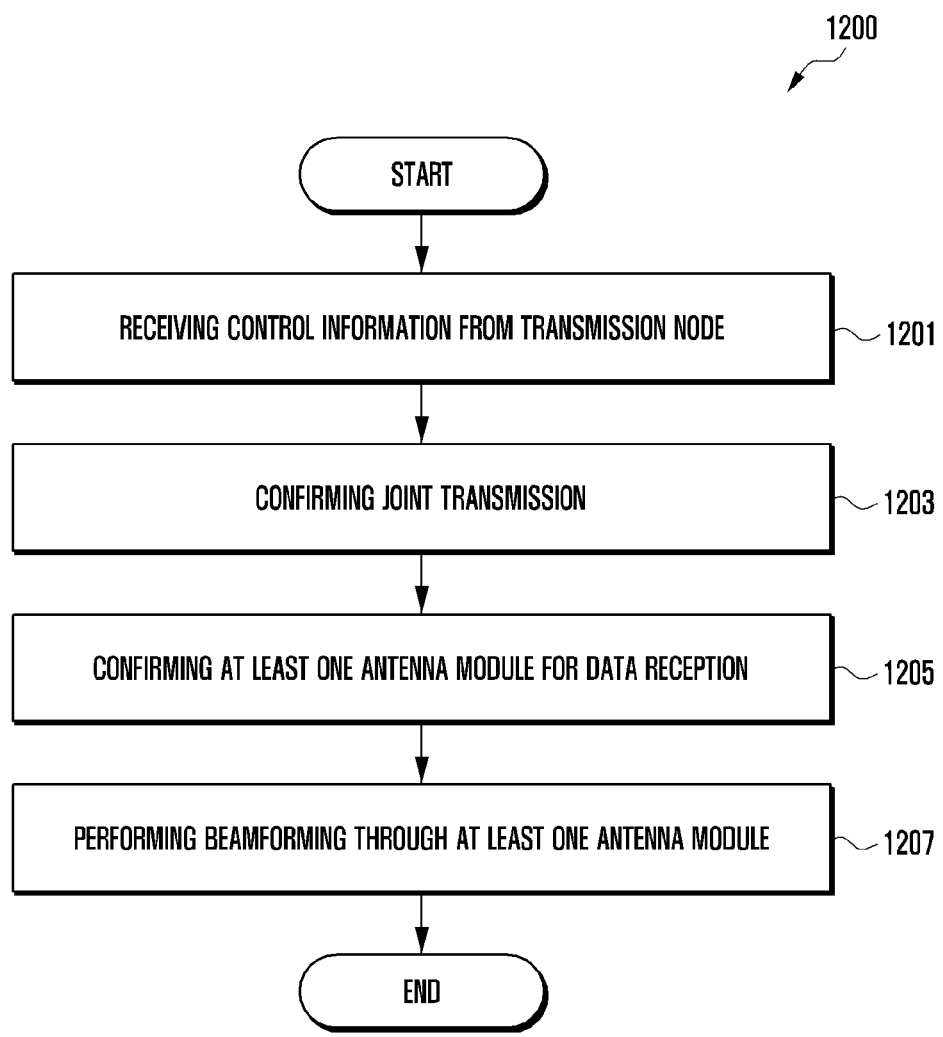
FIG. 12 is a flowchart for joint transmission in an electronic device according to an embodiment of the disclosure.

FIG. 12 is a flowchart 1200 for joint transmission in an electronic device according to an embodiment of the disclosure. In the following embodiment, the respective operations may be sequentially performed, but are not necessarily performed sequentially. For example, the order of each operation may be changed, and at least two operations may be performed in parallel. For example, the electronic device of FIG. 12 may include the electronic device 101 of FIG. 1 or 2, the electronic device 300 of FIGS. 3A and 3B, the electronic device 720 of FIGS. 7A and 7B, or the electronic device 800 of FIG. 8.

Referring to FIG. 12, according to various embodiments, the electronic device (e.g., the processor 120 of FIG. 1 or the processor 810 of FIG. 8) may receive control information from at least one transmission node in operation 1201. According to an embodiment, the processor 810 may receive scheduling information from transmission node 1 700 through PDCCH0 as shown in FIG. 7A. For example, the processor 810 may control the antenna modules 832, 834, and/or 836 such that one antenna module (e.g., the first antenna module 330 of FIG. 3A) among the plurality of antenna modules 832, 834, and 836 are activated to receive scheduling information from transmission node 1 700. According to an embodiment, the processor 810 may receive scheduling information from transmission node 1 700 and transmission node 2 710 through each PDCCH, as shown in FIG. 7B. For example, the processor 810 may control the antenna modules 832, 834, and/or 836 such that at least two antenna modules (e.g., the first antenna module 330 and the third antenna module 334 of FIG. 3A) among the plurality of antenna modules 832, 834, and 836 are activated to receive scheduling information from transmission node 1 700 and transmission node 2 710.

According to various embodiments, in operation 1203, the electronic device (e.g., the processor 120 or 810) may confirm scheduling of joint transmission for receiving data from a plurality of transmission nodes, based on the scheduling information provided from at least one transmission node. According to an embodiment, the processor 810 may determine whether joint transmission is scheduled based on the scheduling information provided from transmission node 1 700 of FIG. 7A. For example, the scheduling information may include at least one of MAC CE information, information related to a radio network temporary identifier (RNTI) descrambling operation, information related to antenna port decoding including demodulation reference signal (DMRS) port index information of DCI received from downlink control indicator (DCI) format 1_0 or 1_1, or information indicated in a transmission configuration indication (TCI) field. According to an embodiment, in case of FIG. 7A, in case that scheduling information is received from transmission node 1 700 and transmission node 2 710 during the period configure for receiving PDCCH, the processor 810 may determine that joint transmission by transmission node 1 700 and transmission node 2 710 has been scheduled.

According to various embodiments, in operation 1205, the electronic device (e.g., the processor 120 or 810) may confirm at least one antenna module for receiving data from a plurality of transmission nodes among the plurality of antenna modules (e.g., the antenna modules 832, 834, and 836). According to an embodiment, the processor 810 may select at least one antenna module 832, 834, or 836 to be used for receiving data from transmission node 1 700 and transmission node 2 710, based on at least one of a beam pattern (e.g., a reception beam pattern) for data reception, link quality, a data reception time point (or a transmission time point), an activation delay time of an antenna module, or a beam pattern switching delay time of an antenna module.

According to various embodiments, in operation 1207, the electronic device (e.g., the processor 120 or 810) may receive data from a plurality of transmission nodes through reception beamforming using at least one antenna module. According to an embodiment, in case that the first antenna module 330 is selected as an antenna module for receiving data, the processor 810 may control the first antenna module such that beam pattern is switched based on a data reception time point (or a transmission time point). For example, the first antenna module 330 may receive data from transmission node 1 700 through a first beam (e.g., a reception beam of 0th index) at a first time point. The first antenna module 330 may be switched to a second beam (e.g., the reception beam of index 1) at a second time point to receive data from transmission node 2 710. For example, in the case of FIG. 7B, the processor 810 may control the third antenna module 334 such that the third antenna module 334 being not used for data reception is deactivated. For example, the data received from transmission node 1 700 and transmission node 2 710 may include identical data, different data, or data related to each other. According to an embodiment, in case that the first antenna module 330 and the third antenna module 334 are selected as antenna modules for receiving data, the processor 810 may receive data from transmission node 1 700 through a beam formed through the first antenna module 330 at a first time point. The processor 810 may receive data from transmission node 2 710 through a beam formed through the third antenna module 334 at the second time point. For example, in the case of FIG. 7A, since the first antenna module 330 is in an activated state to receive scheduling information through PDCCH0, the processor 810 may control the third antenna module 334 such that the third antenna module 334 is additionally activated for data reception.

According to various embodiments, in case that joint transmission is not scheduled, the electronic device 800 may receive data from the corresponding transmission node through one antenna module among a plurality of antenna modules, based on the scheduling information provided from the transmission node. According to an embodiment, the processor 810 may receive data via a transmission node through an antenna module 832, 834, or 836 corresponding to a beam pattern for data reception, among the plurality of antenna modules. For example, in case that data is transmitted through a specific transmission beam from a transmission node, a beam pattern for data reception may be selected, as a reception beam (or a reception beam pattern) having an optimal channel state, based on channel state information measured through a beam search.

Figure 13:
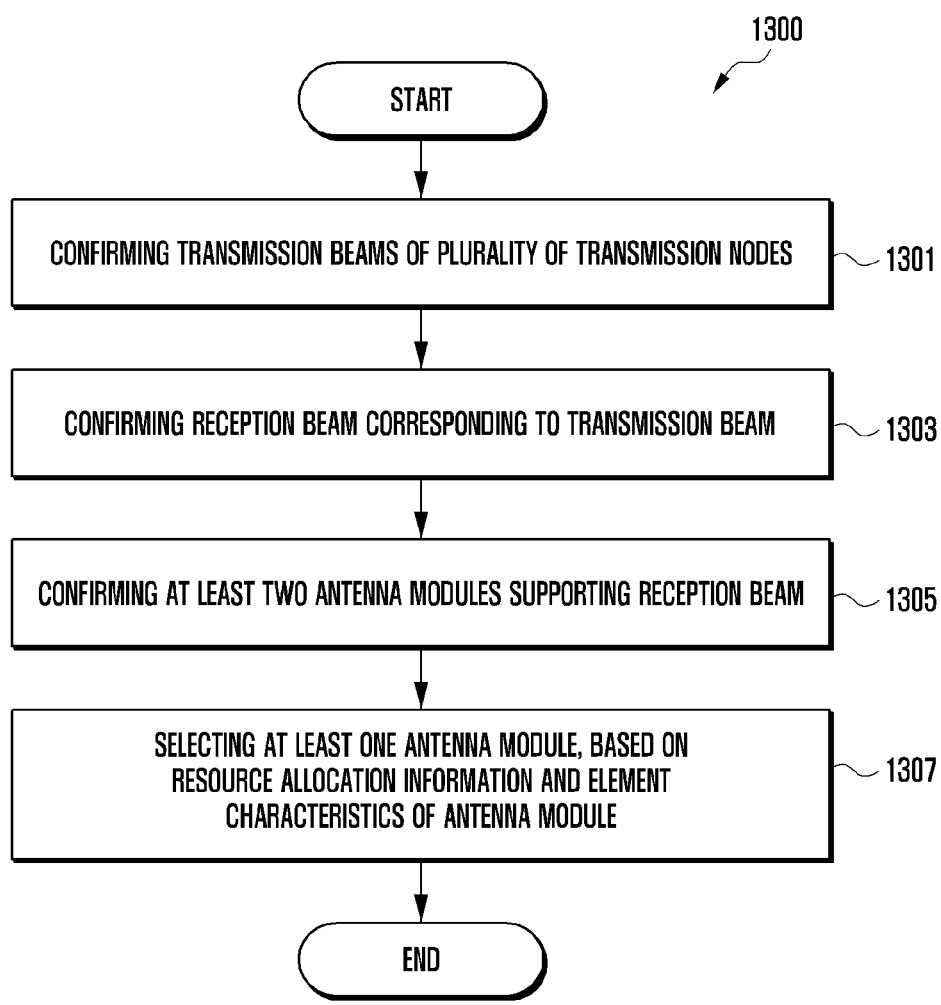
FIG. 13 is a flowchart for selecting an antenna module for joint transmission in an electronic device according to an embodiment of the disclosure.

FIG. 13 is a flowchart 1300 for selecting an antenna module for joint transmission in an electronic device according to an embodiment of the disclosure. According to an embodiment, the operations of FIG. 13 may be detailed operations of operation 1205 of FIG. 12. In the following embodiment, the respective operations may be sequentially performed, but are not necessarily performed sequentially. For example, the order of each operation may be changed, and at least two operations may be performed in parallel. For example, the electronic device of FIG. 13 may include the electronic device 101 of FIG. 1 or 2, the electronic device 300 of FIGS. 3A and 3B, the electronic device 720 of FIGS. 7A and 7B, or the electronic device 800 of FIG. 8. As an example, at least specific configurations of FIG. 13 will be described with reference to FIGS. 14A and 14B.

Figure 14A:
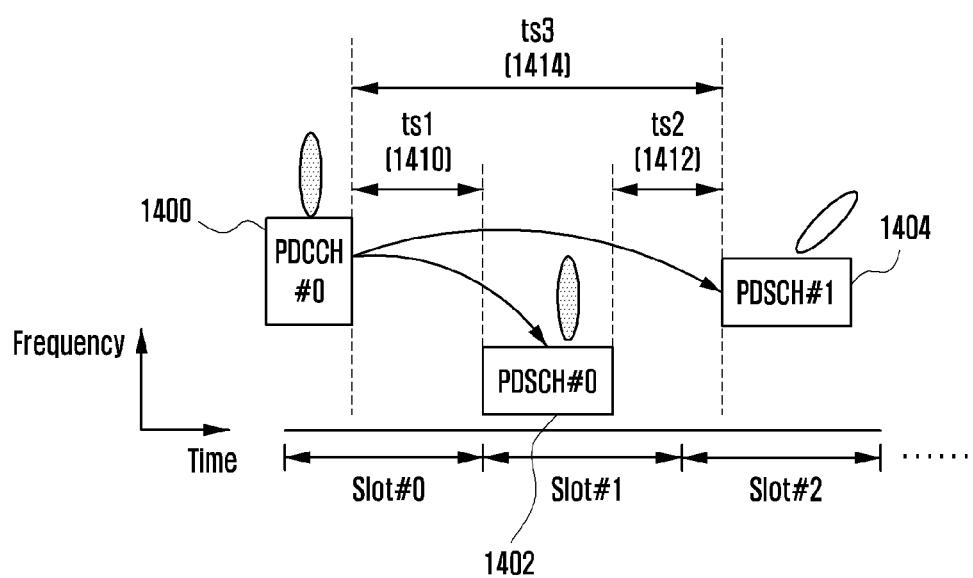
FIGS. 14A and 14B illustrate examples of a time point at which data is to be received in an electronic device, according to various embodiments of the disclosure.
Figure 14B:
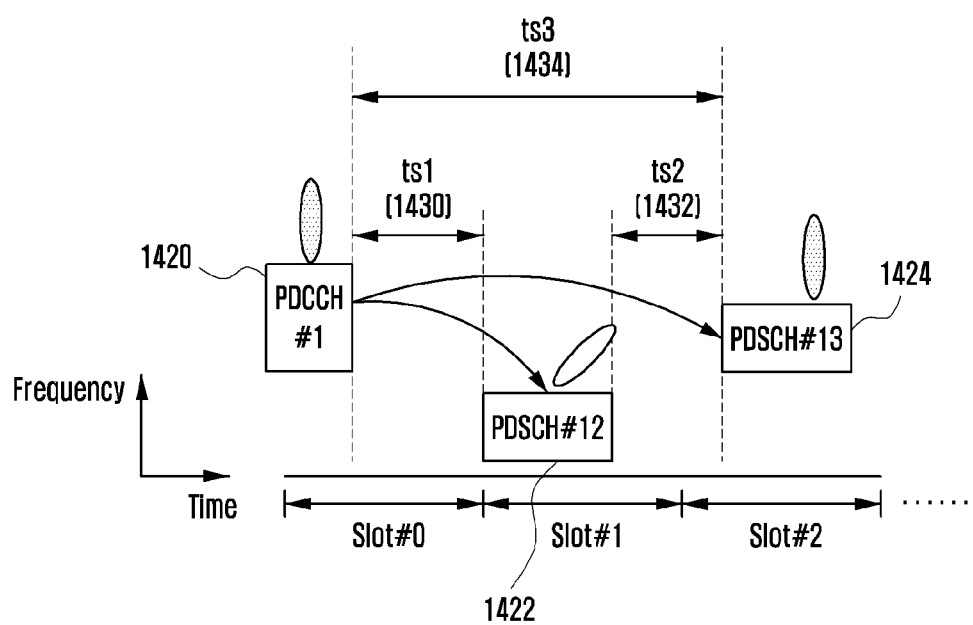

FIGS. 14A and 14B illustrate examples of a time point at which data is to be received in an electronic device according to various embodiments of the disclosure.

Referring to FIG. 13, according to various embodiments, in operation 1301, the electronic device (e.g., the processor 120 of FIG. 1 or the processor 810 of FIG. 8) may confirm a transmission beam used to transmit data from a plurality of transmission nodes.

Referring to FIG. 14A, the processor 810 may receive scheduling information from transmission node 1 700 through PDCCH0 1400. For example, the scheduling information may be received through a beam of 0th index of the first antenna module 330. The processor 810 may confirm a transmission beam for data transmission and a data transmission time point of transmission node 1 700 and transmission node 2 710, based on the scheduling information provided from transmission node 1 700.

According to various embodiments, in operation 1303, the electronic device (e.g., the processor 120 or 810) may confirm reception beams corresponding to transmission beams of a plurality of transmission nodes.

Referring to FIG. 14A, the processor 810 may select a beam of 0th index as a reception beam corresponding to a transmission beam of transmission node 1 700 to receive data through PDSCH0 1402, and may select a beam of index 1 as a reception beam corresponding to a transmission beam of transmission node 2 710 to receive data through PDSCH1 1404. For example, in case that data is transmitted from a transmission node through a specific transmission beam, a reception beam (or a reception beam pattern) having an optimal channel state may be selected as a reception beam corresponding to a transmission beam, based on channel state information measured through a beam search.

According to various embodiments, in operation 1305, the electronic device (e.g., the processor 120 or 810) may confirm at least two antenna modules supporting reception beams corresponding to transmission beams of a plurality of transmission nodes, among the plurality of antenna modules (e.g., the antenna modules 832, 834, and 836). According to an embodiment, the processor 810 may confirm based on FIG. 6D, the first antenna module 330 supporting a beam of index 0 and a beam of index 1, and the third antenna module 334 supporting a beam of index 1.

According to various embodiments, in operation 1307, the electronic device (e.g., the processor 120 or 810) may select at least one antenna module for data reception, based on resource allocation information for a plurality of transmission nodes to transmit data and element characteristics of an antenna module. According to an embodiment, since the beams used to receive PDCCH0 1400 and PDSCH0 1402 of transmission node 1 700 are beams of 0th index which are identical to each other, the processor 810 may control first antenna module 330 such that data is received from transmission node 1 700 through PDSCH0 1402 through the first antenna module 330 used for receiving scheduling information through PDCCH0 1400 where TS1 1410 is the time between the last symbol of PDCCH0 1400 and the start symbol of PDSCH0 1402 of transmission node 1 700. For example, the first antenna module 330 may receive data from transmission node 1 700 through PDSCH0 1402 by performing reception beamforming based on the beam of 0th index. According to an embodiment, in case that TS3 1414, which is the time between the last symbol of PDCCH0 1400 and the start symbol of PDSCH1 1404 of transmission node 2 710, selects an antenna module (e.g., the third antenna module 334) for forming a beam of index 1 and exceeds a time required for activating the corresponding antenna module (e.g., the third antenna module 334), the processor 810 may determine that an additional antenna module (e.g., the third antenna module 334) is activated to receive data from transmission node 2 710. In this case, the processor 810 may control the third antenna module 334 such that the third antenna module 334 supporting the beam of index 1 is activated to receive data from transmission node 2 710. For example, the third antenna module 334 may receive data from transmission node 2 710 through PDSCH1 1404 by performing reception beamforming based on a beam of index 1. For example, the resource allocation information may include information related to time and/or frequency resources for a user to transmit data from a transmission node included in scheduling information. For example, the element characteristics of an antenna module may include a time required for the antenna module to activate the antenna module and/or a time required for switching a beam of the antenna module.

According to an embodiment, in case that TS2 1412, which is the time between the last symbol of PDSCH0 1402 of transmission node 1 700 and the start symbol of PDSCH1 1404 of transmission node 2 710, selects an antenna module (e.g., the first antenna module 330) for forming a beam of index 1 and exceeds a time required for switching a beam pattern of the corresponding antenna module (e.g., the first antenna module 330), the processor 810 may determine that the beam pattern of the antenna module (e.g., the first antenna module 330) is switched for data reception from transmission node 2 710. In this case, the processor 810 may control the first antenna module 330 such that the beam of the first antenna module 330 is switched to the beam of index 1, whereby, through the beam of index 0, data is received through PDSCH0 1402 from transmission node 1 700 and data is received through PDSCH 1 1404 from transmission node 2 710.

According to an embodiment, in case that TS3 1414 selects the third antenna module 334 for forming a beam of index 1 and is less than or equal to a time required for activating the third antenna module 334, and TS2 1412 selects the first antenna module 330 for forming a beam of index 1 and is less than or equal to a time required for switching a beam pattern of the first antenna module 330, the processor 810 may determine that data is received from one transmission node of transmission node 1 700 and transmission node 2 710. For example, in case that data is received from transmission node 1 700, the processor 810 may control the first antenna module 330 such that, through the first antenna module 330 supporting the beam of 0th index, data is received through PDSCH0 1402 from transmission node 1 700. For example, the first antenna module 330 may receive data from transmission node 1 700 through PDSCH 0 1402 by performing reception beamforming based on the beam of 0th index. For example, in case that data is received from transmission node 2 710, the processor 810 may select on antenna module, based on channel state information of the first antenna module 330 and the third antenna module 334 supporting the beam of index 1. For example, the selected antenna module may receive data from transmission node 2 710 through PDSCH1 1404 by performing reception beamforming based on the beam of index 1. For example, the processor 810 may select a transmission node for receiving data, based on at least one of the channel state information of transmission node 1 700 and transmission node 2 710, the type of data, or the data reception priority.

According to an embodiment, in case that a plurality of beams can be simultaneously formed in one antenna module, the processor 810 may control the first antenna module 330 such that data is received from transmission node 1 700 and transmission node 2 710 through the first antenna module 330 supporting the beams of indexes 0 and 1.

According to various embodiments, the electronic device 800 may select at least one antenna module for data reception from transmission node 1 700 and transmission node 2 710 as shown in FIG. 14B. According to an embodiment, the processor 810 may receive scheduling information from transmission node 1 700 through PDCCH1 1420 as shown in FIG. 14B. For example, the scheduling information may be received through a beam of index 1 of the first antenna module 330. The processor 810 may select a beam of index 12 as a reception beam corresponding to a transmission beam of transmission node 1 700 for data reception through PDSCH12 1422 and may select a beam of index 13 as a reception beam corresponding to a transmission beam of transmission node 2 710 for data reception through PDSCH13 1424. For example, the beam of index 12 may be supported by the first antenna module 330, the second antenna module 332, and the fourth antenna module 336, based on FIG. 6D. For example, the beam of index 13 may be supported by the first antenna module 330 and the fourth antenna module 336, based on FIG. 6D.

According to an embodiment, in case that TS1 1430, which is the time between the last symbol of PDCCH1 1420 and the start symbol of PDSCH12 1422 of transmission node 1 700, selects an antenna module (e.g., the second antenna module 332) for forming a beam of index 12 and exceeds a time required for activating the corresponding antenna module (e.g., the second antenna module 332), the processor 810 may determine that the corresponding antenna module (e.g., the second antenna module 332) is activated to receive data from transmission node 1 700. In this case, the processor 810 may control the second antenna module 332 such that data is received from transmission node 1 700 through PDSCH 12 1422. For example, the second antenna module 332 may receive data from transmission node 1 700 through PDSCH12 1422 by performing reception beamforming based on the beam of index 12.

According to an embodiment, in case that TS1 1430 selects an antenna module (e.g., the first antenna module 330) for forming a beam of index 12 and exceeds a time required for switching a beam pattern of the corresponding antenna module (e.g., the first antenna module 330), the processor 810 may determine that the beam pattern of the first antenna module 330 is switched for data reception from transmission node 1 700 through PDSCH 12 1422. In this case, to receive scheduling information from transmission node 1 700 through the beam of index 1 and receive data from transmission node 1 700 through PDSCH 12 1422, the processor 810 may control the first antenna module 330 such that the beam of the first antenna module 330 is switched to the beam of index 12.

According to an embodiment, in case that TS3 1434, which is the time between the last symbol of PDCCH1 1420 and the start symbol of PDSCH13 1424 of transmission node 2 710, selects an antenna module (e.g., the fourth antenna module 336) for forming a beam of index 13 and exceeds the time required for activating the corresponding antenna module (e.g., the fourth antenna module 336), the processor 810 may determine that the corresponding antenna module (e.g., the fourth antenna module 336) is activated to receive data from transmission node 2 710. In this case, the processor 810 may control the fourth antenna module 336 such that the fourth antenna module 336 is activated to receive data from transmission node 2 710 through PDSCH 13 1424. For example, the fourth antenna module 336 may receive data from transmission node 2 710 through PDSCH13 1424 by performing reception beamforming based on the beam of index 13.

According to an embodiment, in case that TS3 1434 selects an antenna module (e.g., the first antenna module 330) for forming a beam of index 13 and exceeds a time required for switching a beam pattern of the corresponding antenna module (e.g., the first antenna module 330), the processor 810 may determine that the beam pattern of the first antenna module 330 is switched for data reception from transmission node 2 710 through PDSCH 13 1424. In this case, the processor 810 may control the first antenna module 330 such that the beam of the first antenna module 330 is switched to the beam of index 13, thereby receiving scheduling information from transmission node 1 700 through the beam of index 1 and receiving data from transmission node 2 710 through PDSCH13 1424.

According to an embodiment, in case that TS2 1432, which is the time between the last symbol of PDSCH12 1422 of transmission node 1 700 and the start symbol of PDSCH13 1424 of transmission node 2 710, selects an antenna module (e.g., the first antenna module 330) for forming a beam of index 13 and exceeds the time required for switching a beam pattern of the corresponding antenna module (e.g., the first antenna module 330), the processor 810 may determine that the beam pattern of the first antenna module 330 is switched to receive data from transmission node 2 710 through PDSCH13 1424. In this case, to receive data from transmission node 1 700 through the beam of index 12 and receive data from transmission node 2 710 through PDSCH13 1424, the processor 810 may control the first antenna module 330 such that the beam of the first antenna module 330 is switched to the beam of index 13.

According to an embodiment, in case that TS1 1430 selects the second antenna module 332 for forming a beam of index 12 and is less than or equal to the time required for activating the second antenna module 332, TS1 1430 selects the first antenna module 330 for forming a beam of index 12 and is less than or equal to the time required for switching a beam pattern of the first antenna module 330, TS3 1434 selects the fourth antenna module 336 for forming a beam of index 13 and is less than or equal to the time required for activating the fourth antenna module 336, or TS3 1434 selects the first antenna module 330 for forming a beam of index 13 and is less than or equal to the time required for switching a beam pattern of the first antenna module 330, the processor 810 may determine that data is received from one of transmission node 1 700 and transmission node 2 710. For example, in case that TS1 1430 selects the second antenna module 332 for forming a beam of index 12 and is less than or equal to the time required for activating the second antenna module 332, TS1 1430 selects the first antenna module 330 for forming a beam of index 12 and is less than or equal to the time required for switching a beam pattern of the first antenna module 330, or TS3 1434 selects the fourth antennal module 336 for forming a beam of index 13 and exceeds the time required for activating the fourth antenna module 336, the processor 810 may determine that data is received from transmission node 2 710. In this case, the processor 810 may control the fourth antenna module 336 such that the fourth antenna module 336 is activated to receive data from transmission node 2 710 through the beam of index 13. For example, in case that TS3 1434 select the fourth antenna module 336 for forming a beam of index 13 and is less than or equal to the time required for activating the fourth antenna module 336, TS3 1434 selects the first antenna module 330 for forming a beam of index 13 and is less than or equal to the time required for switching a beam pattern of the first antenna module 330, or TS1 1430 selects the first antenna module for forming a beam of index 12 and is less than or equal to the time required for switching a beam pattern of the first antenna module 330, the processor 810 may determine that data is received from transmission node 1 700. In this case, to receive scheduling information from transmission node 1 700 through the beam of index 1 and receive data from transmission node 1 700, the processor 810 may control the first antenna module 330 such that the beam of the first antenna module 330 is switched to the beam of index 12.

According to an embodiment, in case that a plurality of beams can be simultaneously formed in one antenna module, the processor 810 may control the first antenna module 330 such that data is received from transmission node 1 700 and transmission node 2 710 through the first antenna module 330 supporting beams of indexes 1, 12, and 13.

According to various embodiments, PDCCH and/or PDSCH transmission may be allocated for every slot as shown in FIGS. 14A and 14B. However, various embodiments of the disclosure are not limited to a case in which PDCCH and/or PDSCH transmission is allocated for every slot. For example, in the case of FIG. 14A, the electronic device 800 may receive a signal (e.g., control information and/or data) within at least one slot through PDCCH0 1400, PDSCH0 1402, and/or PDSCH1 1404. For example, in the case of FIG. 14B, the electronic device 800 may receive a signal within at least one slot through PDCCH1 1420, PDSCH12 1422, and/or PDSCH13 1424.

According to various embodiments, FIGS. 14A and 14B illustrate an operation of receiving data through PDSCH0 733 and/or PDSCH1 735 through reception of one PDCCH0 731 as in FIG. 7A. However, various embodiments of the disclosure are not limited thereto. For example, in the case of an operation of receiving data through PDSCH0 743 and/or PDSCH1 753 through reception of PDCCH0 741 and PDCCH1 751, the electronic device 800 may control the antenna module in the same manner as shown in FIG. 7B. For example, PDCCH0 741 and PDCCH1 751 may be allocated to the same resource and/or timing (e.g., 0st symbol start and two symbol lengths) on the time side. As another example, PDCCH0 741 and PDCCH1 751 may also be allocated to different resources and timings (e.g., 0st symbol or 2nd symbol start and two or three symbol lengths) on the time side.

Figure 15:
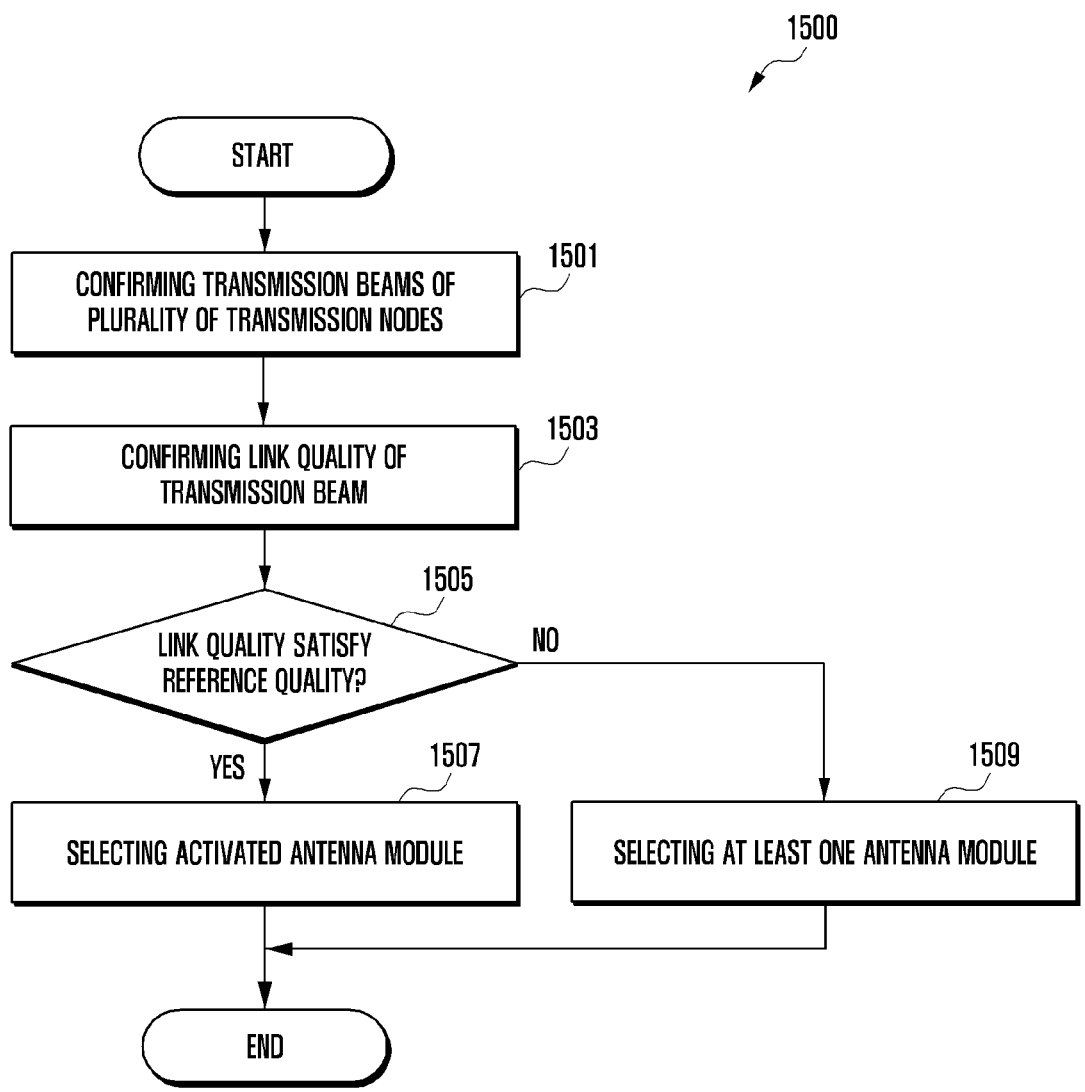
FIG. 15 is a flowchart for selecting an antenna module for joint transmission in an electronic device, based on link quality, according to an embodiment of the disclosure.

FIG. 15 is a flowchart 1500 for selecting an antenna module for joint transmission, based on link quality in an electronic device according to an embodiment of the disclosure. According to an embodiment, the operations of FIG. 15 may be detailed operations of operation 1205 of FIG. 12. In the following embodiment, the respective operation may be sequentially performed, but are not necessarily performed sequentially. For example, the order of each operation may be changed, and at least two operations may be performed in parallel. For example, the electronic device of FIG. 15 may include the electronic device 101 of FIG. 1 or 2, the electronic device 300 of FIGS. 3A and 3B, the electronic device 720 of FIGS. 7A and 7B, or the electronic device 800 of FIG. 8.

Referring to FIG. 15, according to various embodiments, in operation 1501, the electronic device (e.g., the processor 120 of FIG. 1 or the processor 810 of FIG. 8) may confirm a transmission beam to be used to transmit data from a plurality of transmission nodes. According to an embodiment, as shown in FIG. 14A, the processor 810 may confirm a transmit beam (or a transmit beam pattern) to be used for data transmission from transmission node 1 700 and transmission node 2 710, based on scheduling information received from transmission node 1 700 through PDCCH 0 1400.

According to various embodiments, in operation 1503, the electronic device (e.g., the processor 120 or 810) may confirm link quality of transmission beams of the plurality of transmission nodes with respect to activated reception beams of the activated antenna modules among the plurality of antenna modules. According to an embodiment, as shown in FIG. 14A, the processor 810 may confirm link quality of transmission beams of transmission node 1 700 and transmission node 2 710 with respect to reception beam of 0th index of the first antenna module 330 activated to receive scheduling information through PDCCH 0 1400. According to an embodiment, as shown in FIG. 14B, the processor 810 may confirm link quality of transmission beams of transmission node 1 700 and transmission node 2 710 with respect to reception beam of index 4 of the second antenna module 332 activated to monitor reception beam of PDCCH1 1420. According to an embodiment, as shown in FIG. 14B, the processor 810 may confirm link quality of transmission beams of transmission node 1 700 and transmission node 2 710 with respect to reception beam of index 12 of the first antenna module 330 activated to monitor reception beam of PDSCH12 1422. For example, the link quality of the transmission beams may include link reception sensitivity with respect to the transmission beams, and may be confirmed based on periodically measured channel state information.

According to various embodiments, in operation 1505, the electronic device (e.g., the processor 120 or 810) may determine whether link quality of transmission beams of a plurality of transmission nodes satisfies a reference quality. For example, the reference quality is a reference value for determining whether data is received through reception beam of an activated antenna module, and may be configured based on link quality that satisfies a request for a service provided by the electronic device 800.

According to various embodiments, in operation 1507, in case that link quality of transmission beams of a plurality of transmission nodes satisfies the reference quality (e.g., "Yes" in operation 1505), the electronic device (e.g., the processor 120 or 810) may select an activated antenna module among a plurality of antenna modules as an antenna module for data reception. In this case, the electronic device (e.g., the processor 120 or 810) may receive data from the plurality of transmission nodes through an activated reception beam of the activated antenna module. According to an embodiment, as shown in FIG. 14A, in case that link quality of transmission beams of the transmission nodes 700 and 710 for a reception beam of 0th index of the first antenna module 330 activated to receive scheduling information through PDCCH0 1400 satisfies the reference quality, the processor 810 may receive data from transmission node 1 700 and transmission node 2 710 through the reception beam of 0th index of the first antenna module 330. According to an embodiment, as shown in FIG. 14B, in that case that the link quality of the transmission beams of the transmission nodes 700 and 710 with respect to the reception beam of index 4 of the second antenna module 332 activated to monitor the reception beam of PDCCH1 1420 satisfies the reference quality, the processor 810 may receive data from transmission node 1 700 and transmission node 2 710 through the reception beam of index 4 of the second antenna module 332. According to an embodiment, as shown in FIG. 14B, in case that link quality of the transmission beams of the transmission nodes 700 and 710 for the reception beam of index 12 of the first antenna module 330 activated to monitor the reception beam of PDSCH 12 1422 satisfies the reference quality, the processor 810 may receive data from transmission node 1 700 and transmission node 2 710 through the reception beam of index 12 of the first antenna module 330.

According to various embodiments, in operation 1509, in case that link quality of the transmission beams of the plurality of transmission nodes does not satisfy the reference quality (e.g., "No" in operation 1505), the electronic device (e.g., the processor 120 or 810) may select at least one antenna module for receiving data from a plurality of transmission nodes. According to an embodiment, as in operations 1301 to 1307 of FIG. 13, the processor 810 may select at least one antenna module for data reception, based on resource allocation information and element characteristics of the antenna module.

Figure 16:
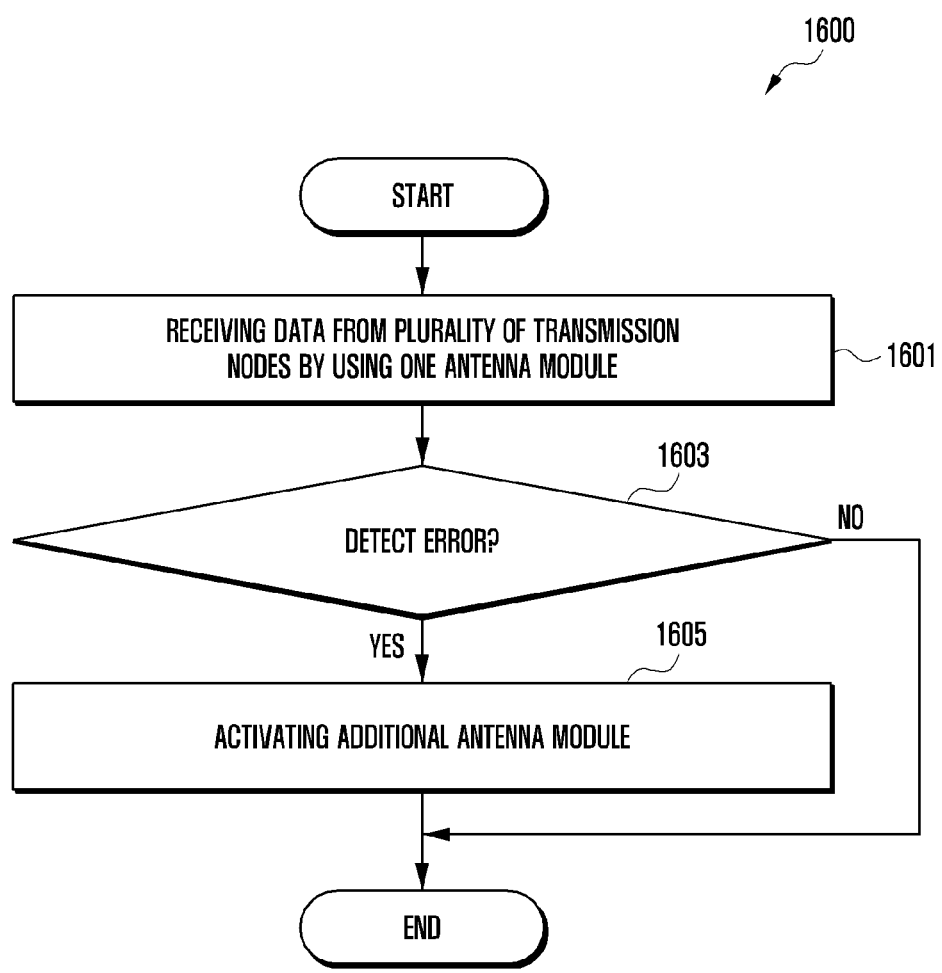
FIG. 16 is a flowchart for activating an additional antenna module in an electronic device according to an embodiment of the disclosure.

FIG. 16 is a flowchart 1600 for activating an additional antenna module in an electronic device according to an embodiment of the disclosure. In the following embodiment, the respective operations may be sequentially performed, but are not necessarily performed sequentially. For example, the order of each operation may be changed, and at least two operations may be performed in parallel. As an example, the electronic device of FIG. 16 may include the electronic device 101 of FIG. 1 or 2, the electronic device 300 of FIGS. 3A and 3B, the electronic device 720 of FIGS. 7A and 7B, or the electronic device 800 of FIG. 8.

Referring to FIG. 16, according to various embodiments, in operation 1601, the electronic device (e.g., the processor 120 of FIG. 1 or the processor 810 of FIG. 8) may receive data from the plurality of transmission nodes by using one antenna module among the plurality of antenna modules. According to an embodiment, as in operations 1301 to 1307 of FIG. 13, the processor 810 may select one antenna module for receiving data from the plurality of transmission nodes, based on resource allocation information and element characteristics of the antenna module. In this case, the processor 810 may receive data from transmission node 1 700 and transmission node 2 710 by switching the beam pattern of the selected antenna module. According to an embodiment, as in operations 1501 to 1509 of FIG. 15, the processor 810 may select one antenna module for receiving data from the plurality of transmission nodes, based on the link quality of the transmission beams. In this case, the processor 810 may receive data from transmission node 1 700 and transmission node 2 710 through the reception beam of the selected antenna module.

According to various embodiments, in operation 1603, the electronic device (e.g., the processor 120 or 810) may confirm whether an error in data received through one antenna module is detected. According to an embodiment, the processor 810 may decode data received from transmission node 1 700 and/or transmission node 2 710 to confirm whether an error is detected.

According to various embodiments, in case that an error in data received through one antenna module is not detected (e.g., "No" in operation 1603), the electronic device (e.g., the processor 120 or 810) may receive data from the plurality of transmission nodes through a reception beam by using one antenna module.

According to various embodiments, in case that an error in data received through one antenna module is detected (e.g., "Yes" in operation 1603), the electronic device (e.g., the processor 120 or 810) may activate an additional antenna module in operation 1605. According to an embodiment, in case that an error in data received from transmission node 1 700 and/or transmission node 2 710 is detected, the processor 810 may request, to transmission node 1 700 and/or transmission node 2 710, retransmission of the data in which an error is detected. In this case, the processor 810 may additionally activate an antenna module supporting an optimal reception beam for a transmission beam of the transmission node that retransmits data to receive retransmission data. For example, the additionally activated antenna module may be switched to an inactive state in case that retransmission data is completely received.

Figure 17:
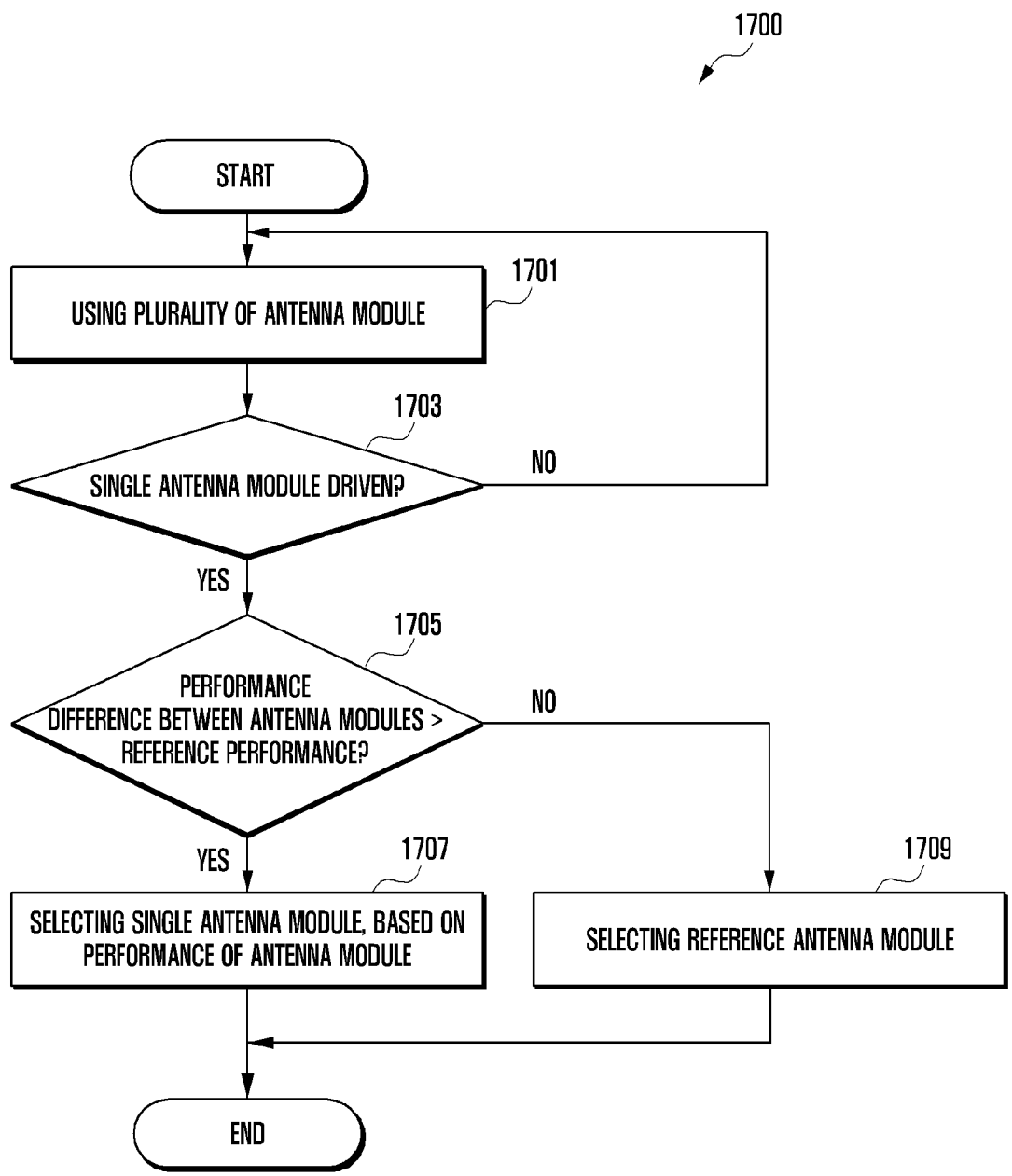
FIG. 17 is a flowchart for using a single antenna module in an electronic device according to an embodiment of the disclosure.

FIG. 17 is a flowchart 1700 for using a single antenna module in an electronic device according to an embodiment of the disclosure. In the following embodiment, the respective operation may be sequentially performed, but are not necessarily performed sequentially. For example, the order of each operation may be changed, and at least two operations may be performed in parallel. For example, the electronic device of FIG. 17 may include the electronic device 101 of FIG. 1 or 2, the electronic device 300 of FIGS. 3A and 3B, the electronic device 720 of FIGS. 7A and 7B, or the electronic device 800 of FIG. 8.

Referring to FIG. 17, according to various embodiments, in operation 1701, the electronic device (e.g., the processor 120 of FIG. 1 or the processor 810 of FIG. 8) may receive data from the plurality of transmission nodes through reception beamforming using the plurality of antenna modules. According to an embodiment, as in operations 1301 to 1307 of FIG. 13, the processor 810 may select a plurality of antenna modules for receiving data from the plurality of transmission nodes, based on resource allocation information and element characteristics of the antenna modules. For example, the processor 810 may receive data from transmission node 1 700 through the beam of index 12 of the first antenna module 330 and receive data from transmission node 2 710 through the beam of index 13 of the fourth antenna module 336. According to an embodiment, as in operations 1501 to 1509 of FIG. 15, the processor 810 may select a plurality of antenna modules for receiving data from the plurality of transmission nodes, based on link quality of transmission beams. According to an embodiment, as in operations 1601 to 1605 of FIG. 16, in case that an error in received data is detected, the processor 810 may receive retransmission data through the plurality of antenna modules.

According to various embodiments, the electronic device (e.g., the processor 120 or 810) may determine whether to drive a single antenna module in operation 1703. According to an embodiment, in case that no joint transmission is received from a plurality of transmission nodes for a reference time, the processor 810 may determine that the transmission node performs a single transmission. In this case, the processor 810 may determine that a single antenna module is driven. According to an embodiment, in case that the retransmission data is completely received, the processor 810 may determine that the single antenna module is being driven. According to an embodiment, the processor 810 may determine whether to drive a single antenna module, based on at least one of heating state information or a battery state of the electronic device 800.

According to various embodiments, in case that the electronic device (e.g., the processor 120 or 810) determines that a single antenna module is not driven (e.g., "No" in operation 1703), the electronic device may receive data from a plurality of transmission nodes through reception beamforming using a plurality of antenna modules.

According to various embodiments, in case that the electronic device (e.g., the processor 120 or 810) determines that a single antenna module is driven (e.g., "Yes" in operation 1703), the electronic device may confirm in operation 1705 whether the performance difference between the activated plurality of antenna modules exceeds a reference performance. For example, the performance difference between the antenna modules may include the difference in reception sensitivity of the antenna modules.

According to various embodiments, in operation 1707, in case that the performance difference between the plurality of antenna modules exceeds the reference performance (e.g., "Yes" in operation 1705), the electronic device (e.g., the processor 120 or 810) may select a single antenna module for maintaining an active state, based on at least one of heating information or performance of the antenna module. According to an embodiment, the processor 810 may select one antenna module having relatively good antenna performance among the plurality of activated antenna modules as a single antenna module. According to an embodiment, the processor 810 may select an antenna module having a relatively low temperature among the plurality of activated antenna modules as a single antenna module. For example, an unselected antenna module among the plurality of antenna modules may be deactivated.

According to various embodiments, in operation 1709, in case that the performance difference between the plurality of antenna modules is less than or equal to the reference performance (e.g., "No" in operation 1705), the electronic device (e.g., the processor 120 or 810) may select a reference antenna module among the plurality of antenna modules as a single antenna module for maintaining an active state. For example, the reference antenna module may include an antenna module activated during initial transmission (e.g., PDCCH) of a transmission node or a relatively recently activated antenna module.

According to various embodiments, a method for operating an electronic device (e.g., the electronic device 101 of FIG. 1, the electronic device 101 of FIG. 2, the electronic device 300 of FIGS. 3A and 3B, the electronic device 720 of FIGS. 7A and 7B, or the electronic device 800 of FIG. 8) may include receiving control information from at least one transmission node by using a first antenna module among a plurality of antenna modules (e.g., the antenna module 197 of FIG. 1 or the antenna modules 832, 834, and 836 of FIG. 8), selecting at least one antenna module from among the plurality of antenna modules in case that data is received from the plurality of transmission nodes, based on the control information, and forming a reception beam, based on the at least one antenna module.

According to various embodiments, the control information may include scheduling information received through a physical downlink control channel (PDCCH) of the at least one transmission node.

According to various embodiments, the method may further include determining whether data is received from the plurality of transmission nodes, based on at least one of information related to a radio network temporary identifier (RNTI) descrambling operation included in the scheduling information, information related to antenna port decoding including demodulation reference signal (DMRS) port index information of a downlink control indicator (DCI), or information indicated in a transmission configuration indication (TCI) field.

According to various embodiments, the method may further include determining whether data is received from the plurality of transmission nodes, based on the number of the control information received during a predefined period for receiving control information.

According to various embodiments, the selecting at least one antenna module may include confirming, in case that data is received from the plurality of transmission nodes, a transmission beam of each transmission node, confirming a reception beam corresponding to the transmission beam of each transmission node, confirming at least two antenna modules supporting the reception beam, among the plurality of antenna modules, and selecting the at least one antenna module from among the at least two antenna modules supporting the reception beam.

According to various embodiments, the selecting at least one antenna module may include selecting the at least one antenna module, based on at least one of a data transmission time point, an activation delay time of an antenna module, or a beam switching delay time of an antenna module.

According to various embodiments, the selecting at least one antenna module may include confirming, in case that data is received from the plurality of transmission nodes, a transmission beam of each transmission node, confirming, in case that one antenna module among the plurality of antenna modules is activated, link quality of the transmission beam of each transmission node with respect to a reception beam of the activated one antenna module, and selecting, in case that the link quality of the transmission beam satisfies a specified condition, the activated one antenna module.

According to various embodiments, the method may further include selecting an additional antenna module from among the plurality of antenna modules in case that the link quality of the transmission beam does not satisfy a specified condition, and the forming the reception beam may include forming a reception beam, based on the activated one antenna module and the additional antenna module.

According to various embodiments, the method may further include selecting at least one antenna module to be used for a beam search from among the plurality of antenna modules, based on at least one of motion information of the electronic device or a battery state of the electronic device.

According to various embodiments of the disclosure, an electronic device may form a reception beam by using at least one antenna module among multiple antenna modules, thereby receiving data from multiple transmission nodes (for example, transmit-receive point (TRP) or base station) through at least one slot.

According to various embodiments, an electronic device may have an antenna module configured to support multiple beam patterns, and may select at least one antenna module for forming a reception beam from the multiple antenna modules, based on at least one of the data transmission timepoint, the antenna module's activation delay time, or the antenna module's beam pattern switching delay time, thereby reducing power consumption for receiving data from multiple transmission nodes (for example, transmit-receive point (TRP) or base station).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a plurality of antenna circuitries;
a processor electrically connected to the plurality of antenna circuitries; and
memory storing instructions which, when executed by the processor, cause the electronic device to:
receive control information from at least one transmission node by using an activated antenna circuitry among the plurality of antenna circuitries,
in case that data is received from a plurality of transmission nodes based on the control information, identify a transmission beam of each transmission node and identify a link quality of the identified transmission beam of each transmission node, wherein the link quality is related to a reception beam of the activated antenna circuitry,
in case that the link quality of the identified transmission beam satisfies a specified condition, receive data from the plurality of transmission nodes through the reception beam of the activated antenna circuitry, and
in case that the link quality of the transmission beam does not satisfy the specified condition, select an additional antenna circuitry from among the plurality of antenna circuitries and receive data from the plurality of transmission nodes through the reception beam of the activated antenna circuitry and a reception beam of the additional antenna circuitry.

2. The electronic device of claim 1, wherein the memory stores instructions which, when executed by the processor, cause the electronic device to:
determine whether data is received from the plurality of transmission nodes, based on at least one of information related to a radio network temporary identifier (RNTI) descrambling operation included in scheduling information received through a physical downlink control channel (PDCCH) of the at least one transmission node, information related to antenna port decoding including demodulation reference signal (DMRS) port index information of a downlink control indicator (DCI) or information indicated in a transmission configuration indication (TCI) field.

3. The electronic device of claim 1, wherein the memory stores instructions which, when executed by the processor, cause the electronic device to:
determine whether data is received from the plurality of transmission nodes, based on a number of the control information received during a predefined period for receiving control information.

4. The electronic device of claim 1, wherein the control information includes resource allocation information including time and frequency resources used for receiving the data from the plurality of transmission nodes.

5. The electronic device of claim 1, wherein the control information is received on a physical downlink control channel (PDCCH) and the data is received on physical downlink shared channel (PDSCH).

6. The electronic device of claim 1,
wherein, to identify the transmission beam of each transmission node, the memory stores instructions which, when executed by the processor, cause the electronic device to:
confirm the link quality of the identified transmission beam of each transmission node based on scheduling information received from the at least one transmission node, and
wherein the link quality of the identified transmission beam of each transmission node is identified based on periodically measured channel state information.

7. A method for operating an electronic device, the method comprising:
receiving control information from at least one transmission node by using an activated antenna circuitry among a plurality of antenna circuitries;
in case that the electronic device receives data from a plurality of transmission nodes based on the control information, identifying a transmission beam of each transmission node and identifying a link quality of the identified transmission beam of each transmission node, wherein the link quality is related to a reception beam of the activated antenna circuitry;
in case that the link quality of the identified transmission beam satisfies a specified condition, receiving data from the plurality of transmission nodes through the reception beam of the activated antenna circuitry; and
in case that the link quality of the transmission beam does not satisfy the specified condition, selecting an additional antenna circuitry from among the plurality of antenna circuitries and receiving data from the plurality of transmission nodes through the reception beam of the activated antenna circuitry and a reception beam of the additional antenna circuitry.

8. The method of claim 7, further comprising:
determining whether data is received from the plurality of transmission nodes, based on at least one of information related to a radio network temporary identifier (RNTI) descrambling operation included in scheduling information received through a physical downlink control channel (PDCCH) of the at least one transmission node, information related to antenna port decoding including demodulation reference signal (DMRS) port index information of a downlink control indicator (DCI), or information indicated in a transmission configuration indication (TCI) field.

9. The method of claim 7, further comprising:
determining whether data is received from the plurality of transmission nodes, based on a number of the control information received during a predefined period for receiving control information.

10. The method of claim 7, wherein the control information includes resource allocation information including time and frequency resources used for receiving the data from the plurality of transmission nodes.

* * * * *